US011063779B2

(12) United States Patent
Kubo et al.

(10) Patent No.: US 11,063,779 B2
(45) Date of Patent: Jul. 13, 2021

(54) CONTENT SERVER, INFORMATION SHARING SYSTEM, COMMUNICATION CONTROL METHOD, AND NON-TRANSITORY COMPUTER-READABLE MEDIUM

(71) Applicants: Naohiko Kubo, Kanagawa (JP); Hiroshi Baba, Kanagawa (JP)

(72) Inventors: Naohiko Kubo, Kanagawa (JP); Hiroshi Baba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/728,074

(22) Filed: Dec. 27, 2019

(65) Prior Publication Data
US 2020/0210136 A1 Jul. 2, 2020

(30) Foreign Application Priority Data

Dec. 28, 2018 (JP) .............................. JP2018-247029
Dec. 20, 2019 (JP) .............................. JP2019-230657

(51) Int. Cl.
*H04L 12/18* (2006.01)
*G06F 3/14* (2006.01)
(Continued)

(52) U.S. Cl.
CPC ........ *H04L 12/1831* (2013.01); *G06F 3/1454* (2013.01); *H04N 7/155* (2013.01);
(Continued)

(58) Field of Classification Search
CPC ... G06F 3/1454; H04L 12/18; H04L 12/1813; H04L 12/1818; H04L 12/1822;
(Continued)

(56) References Cited

U.S. PATENT DOCUMENTS 7,880,719 B2 * 2/2011 Kritt ................... H04L 12/1827
345/156
9,438,858 B1 9/2016 Evans et al.
(Continued)

FOREIGN PATENT DOCUMENTS

JP 2008-003968 1/2008
JP 2014-022985 2/2014

OTHER PUBLICATIONS

Loui, Alexander C., and Andreas Savakis. "Automated event clustering and quality screening of consumer pictures for digital albuming." IEEE Transactions on Multimedia 5.3 (2003): 390-402. (Year: 2003).*

(Continued)

*Primary Examiner* — Atta Khan
*Assistant Examiner* — William C McBeth
(74) *Attorney, Agent, or Firm* — Oblon, McClelland, Maier & Neustadt, L.L.P.

(57) ABSTRACT

A content server manages contents used in one or more events. The server includes one or more memories that store, for each one of one or more participants of an event, one or more capture images, each capture image being an image of particular content of a plurality of contents used in the event and having been captured to a personal terminal of the participant during the event in response to an operation to capture the image of the particular content to the personal terminal. The server further includes circuitry configured to transmit distinction information distinguishing each capture image to a particular information processing terminal.

11 Claims, 22 Drawing Sheets

(51) Int. Cl.
 *H04N 7/15* (2006.01)
 *G06K 9/00* (2006.01)
(52) U.S. Cl.
 CPC .............. *G06K 2009/00738* (2013.01); *H04L 12/1813* (2013.01); *H04N 7/15* (2013.01)
(58) Field of Classification Search
 CPC ... H04L 12/1831; H04L 65/4015; H04N 7/15; H04N 7/155
 See application file for complete search history.

(56) References Cited

U.S. PATENT DOCUMENTS

| | | | |
|---|---|---|---|
| 2007/0200921 A1* | 8/2007 | Horikiri | H04N 7/15 348/14.08 |
| 2008/0141167 A1 | 6/2008 | Kubo et al. | |
| 2008/0290583 A1 | 11/2008 | Kubo et al. | |
| 2009/0234721 A1* | 9/2009 | Bigelow | G06Q 10/10 705/12 |
| 2012/0069356 A1 | 3/2012 | Kubo et al. | |
| 2012/0166952 A1* | 6/2012 | Alexandrov | G06Q 10/101 715/730 |
| 2012/0229852 A1 | 9/2012 | Kubo et al. | |
| 2012/0233000 A1* | 9/2012 | Fisher | G06F 16/58 705/14.71 |
| 2012/0324002 A1* | 12/2012 | Chen | G06F 16/51 709/204 |
| 2013/0086165 A1 | 4/2013 | Findlay et al. | |
| 2013/0215464 A1 | 8/2013 | Kubo et al. | |
| 2013/0258042 A1* | 10/2013 | Shun | H04L 12/1827 348/14.08 |
| 2014/0043366 A1 | 2/2014 | Tsukuda | |
| 2014/0258214 A1 | 9/2014 | Tsukamoto | |
| 2015/0052200 A1* | 2/2015 | Ouyang | H04L 12/1813 709/204 |
| 2015/0350266 A1* | 12/2015 | O'Brien | H04L 65/403 709/204 |
| 2016/0198055 A1 | 7/2016 | Kubo | |
| 2016/0283586 A1* | 9/2016 | Thapliyal | G06Q 10/10 |
| 2016/0294762 A1* | 10/2016 | Miller | H04L 65/4007 |
| 2016/0381110 A1* | 12/2016 | Barnett | H04L 67/306 709/231 |
| 2019/0087154 A1* | 3/2019 | Hirukawa | G06F 3/0484 |
| 2019/0265941 A1 | 8/2019 | Baba | |
| 2019/0303880 A1 | 10/2019 | Hashimoto et al. | |

OTHER PUBLICATIONS

Dickson, Paul E., W. Richards Adrion, and Allen R. Hanson. "Automatic capture and presentation creation from multimedia lectures." 2008 38th Annual Frontiers in Education Conference. IEEE, 2008. (Year: 2008).*

Extended European Search Report dated Apr. 30, 2020, in Patent Application No. 19219681.4, 9 pages.

\* cited by examiner

FIG. 4A

EVENT ID : ......  URL : ......  USER ID : ......

| CONTENT ID | CONTENT DATA | DISPLAY POSITION | CREATION DATE AND TIME |
|---|---|---|---|
| c101 | TYPE: TEXT "I"<br>FONT TYPE: aaa<br>SIZE: 20 | (960, 270) | 2018/12/01  10:10 |
| c102 | TYPE: IMAGE<br>FILE NAME: xxx.jpeg | (200, 10) | 2018/12/01  10:20 |
| c103 | TYPE: VECTOR<br>NUMERICAL VALUE DATA: .... | (1000, 500) | 2018/12/01  10:30 |
| ... | ... | ... | ... |

FIG. 4B

EVENT ID : ......  URL : ......

| CONTENT ID | CONTENT DATA | DISPLAY POSITION | CREATION DATE AND TIME |
|---|---|---|---|
| c201 | TYPE: TEXT "R"<br>FONT TYPE: aaa<br>SIZE: 20 | (400, 270) | 2018/12/01  10:15 |
| c202 | TYPE: IMAGE<br>FILE NAME: xxx.jpeg | (400, 20) | 2018/12/01  10:25 |
| c203 | TYPE: VECTOR<br>NUMERICAL VALUE DATA: .... | (120, 600) | 2018/12/01  10:35 |
| ... | ... | ... | ... |

FIG. 4C

| EVENT ID | EVENT NAME | EVENT DATE AND TIME | EVENT LOCATION | ORGANIZER ID (ORGANIZER NAME) | PARTICIPANT ID (PARTICIPANT NAME) |
|---|---|---|---|---|---|
| e001 | REGULAR | 2018/12/1 10:00–11:00 | 1st FLOOR, MEETING ROOM A | u001 (USER A) | u002 (USER B), u003 (USER C) |
| ⋮ | ⋮ | ⋮ | ⋮ | ⋮ | ⋮ |

FIG. 19

Event Information

Enter keyword  [Search]

| Event Name | Event Date and Time | Event Place | Detailed Information |
|---|---|---|---|
| Regular | 2018/12/1 10:00–11:00 | 1st floor, Meeting room A | [Acquire] |
| New Product Planning | 2018/12/2 10:00–12:00 | 2nd floor, Meeting room A | [Acquire] |
| ... | ... | ... | ... |

FIG. 20

Detailed Event Information

[Event Details]
Event name: Regular
Event date and time: 2018/12/1 10:00-11:00
Event place: 1st floor, Meeting room A
Organizer: User A
Participant: User B, User C

[Capture Information]

Enter participant's name [Filter]

| | 1 | 2 | 3 | |
|---|---|---|---|---|
| Thumbnail | 🖼 | 🖼 | 🖼 | |
| Number of Captures | 1 | 2 | 3 | |

CONTENT SERVER, INFORMATION SHARING SYSTEM, COMMUNICATION CONTROL METHOD, AND NON-TRANSITORY COMPUTER-READABLE MEDIUM

CROSS-REFERENCE TO RELATED APPLICATIONS

This patent application is based on and claims priority pursuant to 35 U.S.C. § 119(a) to Japanese Patent Application Nos. 2018-247029, filed on Dec. 28, 2018, and 2019-230657, filed on Dec. 20, 2019, in the Japan Patent Office, the entire disclosures of which are hereby incorporated by reference herein.

BACKGROUND

Technical Field

The present disclosure relates to sharing contents via a communication network.

Description of the Related Art

In recent years, telework using an information communication technology (ICT) has been adopted, which allows employees to work flexibly without being restricted by where and when they work. To allow persons at different remote places to join a conference or a meeting even when one or more of them work remotely, materials or documents used in the conference or meeting are shared through a communication network or a video conference is conducted using the communication network. In this case, a sever sets up a virtual room. Users who have joined this virtual room share materials or documents, thereby a virtual meeting close to a real conference room can be conducted.

Further, a conventional method is known in which an organizer of an event such as a meeting talks while displaying multiple images (pages). According to such conventional method, participants are photographed with a camera so that a particular one or more images to which each participant has paid attention are predicted based on the direction to which each participant looks at or the facial expression of each participant.

SUMMARY

According to an embodiment of the present disclosure, a content server manages contents used in one or more events. The server includes one or more memories that store, for each one of one or more participants of an event, a capture image, the capture image being an image of particular content of a plurality of contents used in the event and having been captured to a personal terminal of the participant during the event in response to an operation to capture the image of the particular content to the personal terminal. The server further includes circuitry configured to transmit distinction information distinguishing each capture image to a particular information processing terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4A is a conceptual diagram illustrating an example data structure of a personal content management table, according to an embodiment of the present disclosure;

FIG. 4B is a conceptual diagram illustrating an example data structure of a shared content management table, according to an embodiment of the present disclosure;

FIG. 4C is a conceptual diagram illustrating an example data structure of an event information management table, according to an embodiment of the present disclosure;

FIG. 19 is a diagram illustrating a display example of an event information screen, according to an embodiment of the present disclosure; and FIG. 20 is a diagram illustrating a display example of an event detail screen, according to an embodiment of the present disclosure.

Figure 1:
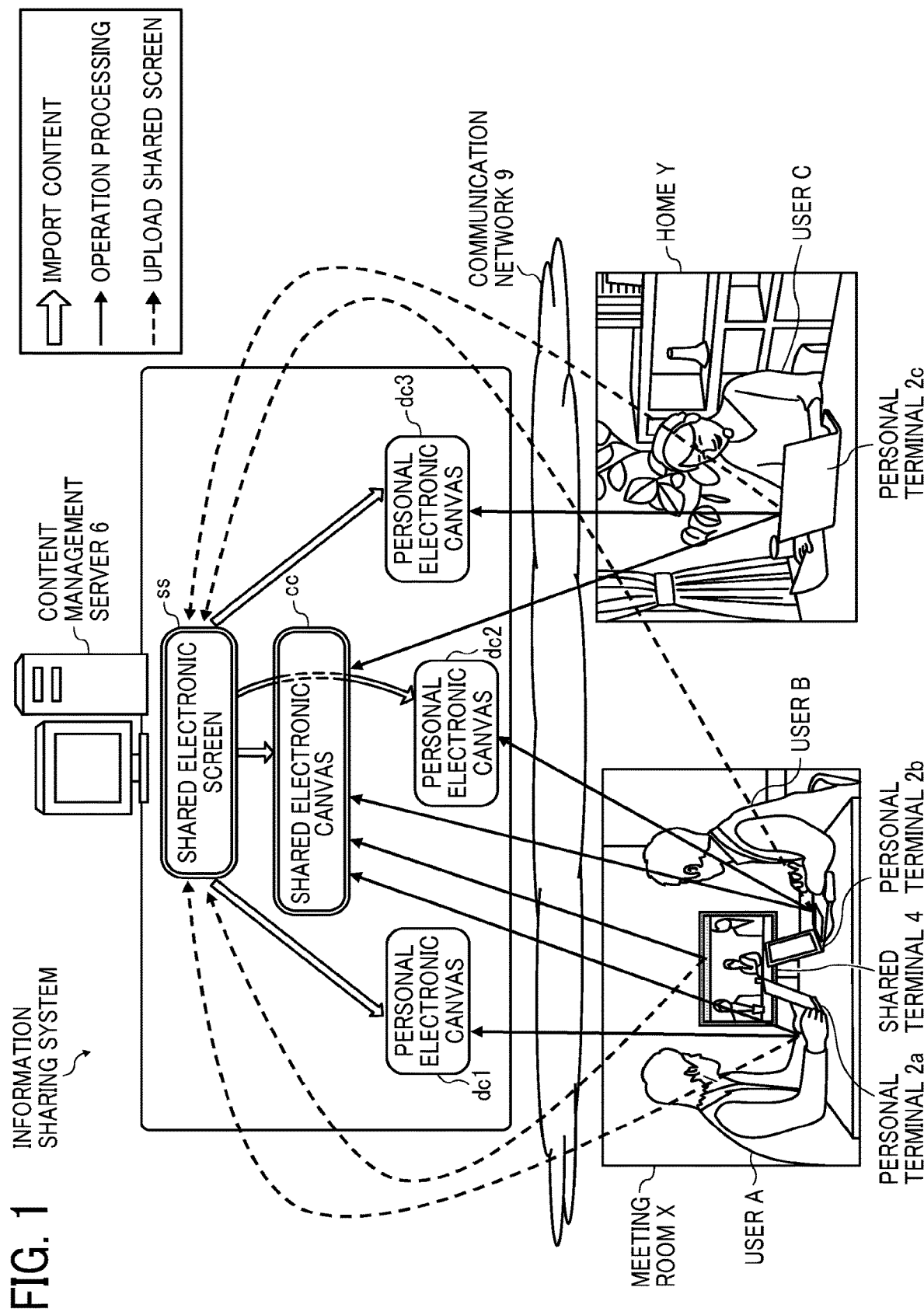
FIG. 1 is a schematic diagram illustrating an overview of an information sharing system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is now given of an embodiment of the present disclosure, with reference to FIG. 1 to FIG. 20.

Overview of Information Sharing System:

First, with reference to FIG. 1, an overview of an information sharing system according to the present embodiment is described. FIG. 1 is a schematic diagram illustrating an overview of the information sharing system according to the present embodiment. FIG. 1 illustrates a case in which a user A and a user B, who are in a conference room X of a company, and a user C who is at a home Y, are conducting a remote meeting by using the information sharing system. The user A users a personal terminal 2a in the conference room X, and the user B uses a personal terminal 2b in the conference room X. Further, a shared terminal 4 that can be shared by multiple users is provided in the conference room X. The user C uses a personal terminal 2c at the home Y. In the following description, the personal terminal 2a, the personal terminal 2b, and the personal terminal 2c are collectively referred to as simply a "personal terminal 2" or "personal terminals 2", unless these terminals need to be distinguished from each other.

The personal terminal 2 is a computer that a user can use individually or exclusively and whose screen is viewed by the user individually. The personal terminal 2 is not limited to being privately-owned. The personal terminal 2 may be public, private, non-profit, rental or any other type of ownership terminal in which a user may individually or exclusively use the terminal and whose screen is viewed by the user individually. The shared terminal 4 is a computer that multiple users can use together and whose screen is viewed by the multiple users. Examples of the personal terminal 2 and the shared terminal 4 include a tablet terminal, a smartphone, a personal computer (PC), a personal digital assistant (PDA), a smartwatch, an electronic whiteboard, a digital television, a game apparatus, a multifunction peripheral (MFP) having a copier function, and a car navigation system. Each of the personal terminal 2 and the shared terminal 4 is an example of a communication terminal (or an information processing terminal).

Each of the personal terminal 2 and the shared terminal 4 can communicate with the content management server 6 through a communication network 9 such as the Internet. The communication network 9 is, for example, one or more local area networks (LANs) inside the firewall. In another example, the communication network 9 includes the Internet that is outside the firewall in addition to the LAN. In still another example, the communication network 9 further includes a virtual private network (VPN) and/or a wide-area Ethernet (registered trademark). The communication network 9 is any one of a wired network, a wireless network, and a combination of the wired network and the wireless network. In a case where the shared terminal 4, the personal terminal 2 or the content management server 6 connects to the communication network 9 through a mobile phone network such as 3G, Long Term Evolution (LTE), 4G, the LAN can be omitted.

The content management server 6 is a computer functioning as a web server (or HTTP server) that stores and manages data of contents to be transmitted to the personal terminal 2 and the shared terminal 4. The content management server 6 includes a storage unit 6000 described below. The storage unit 6000 stores storage locations (or storage areas) for implementing a personal electronic campus that can be accessed only from each personal terminal 2. More specifically, only the personal terminal 2a, the personal terminal 2b and the personal terminal 2c can access a personal electronic canvas dc1, a personal electronic canvas dc2 and a personal electronic canvas dc3, respectively. In the following description, the personal electronic canvas dc1, the personal electronic canvas dc2 and the personal electronic canvas dc3 are collectively referred to as a "personal electronic canvas dc", unless these canvases need to be distinguished from each other.

In one example, the content management server 6 supports cloud computing. The term "cloud computing" refers to internet-based computing where resources on a network are used or accessed without identifying specific hardware resources.

Further, the storage unit 6000 of the content management server 6 includes a storage location (or a storage area) for implementing a shared electronic canvas cc that can be accessed from each of the personal terminals 2. Furthermore, the storage unit 6000 of the content management server 6 includes a storage location (or a storage area) for implementing a shared electronic screen ss that can be accessed from each of the personal terminals 2.

In this disclosure, the "electronic canvas" is not an actual cloth canvas but a virtual space generated in the storage location (or the storage area) in the storage unit 6000 of the content management server 6. For example, the electronic canvas can be accessed by using a web application for an electronic canvas, the web application having a function of allowing a user to view and edit a content with the canvas element and JavaScript (registered trademark). The "web application" refers to software used on a web browser. The web application is implemented by a program written in a script language such as JavaScript (registered trademark) that operates on a web browser application and a program on a web server side, which operate in cooperation with each other. Further, the web application refers to a mechanism that implements such software. The personal electronic canvas and the shared electronic canvas have infinite (i.e. without a pre-determined size) areas within the range of the storage area in the storage unit 6000.

In addition, the "electronic screen" is not a white screen for projecting a movie or a slide image for viewing but instead refers to a virtual space generated in a storage location (or storage area) in the storage unit 6000 of the content management server 6. Different from the electronic canvas, the electronic screen simply holds data of a content to be transmitted (distributed) to the personal terminals 2 and the shared terminal 4 and holding the previous content until acquiring the next content. The electronic screen can be accessed by using a web application for an electronic screen, the web application having a function of allowing a user to view content.

The "personal electronic canvas" refers to an electronic space dedicated to each of the users participating in a remote meeting. The personal terminal 2 of each user can access only the personal electronic canvas dedicated to the corresponding user, which allows the corresponding user to view and/or edit (input, delete, copy, etc.) contents such as characters and images on the accessed personal electronic canvas. The "shared electronic canvas" refers to an electronic space that users participating in the remote meeting use together or share. Any of the personal terminals 2 of the users can access the shared electronic canvas, which allows the users to view and/or edit (input, delete, copy, etc.) contents such as characters and images.

The "shared electronic screen" refers to an electronic space shared by users participating in the remote meeting. Any of the personal terminals 2 of the users can access the shared electronic screen, which allows the users to view a shared screen held by the shared electronic screen. However, unlike the personal electronic canvas and the shared electronic canvas, the shared electronic screen simply holds data of content to be transmitted (distributed) to the personal terminals 2 and the shared terminal 4 and holding the previous content until acquiring the next content. For example, in a case where data of a content is transmitted from the personal terminal 2a to the shared electronic screen ss and thereafter data of a content is transmitted from the personal terminal 2b to the shared electronic screen ss, data of a content held by the shared electronic screen ss is the data received latest.

The content management server 6 stores, for each of virtual rooms, information (data) such as contents developed on the shared electronic screen ss, the shared electronic canvas cc, and the personal electronic canvas dc in association with the corresponding virtual room. Thereby, even when the content management server 6 manages multiple virtual rooms, data of a content are not communicated over different virtual rooms.

Each personal terminal 2 causes the above-described web application operating on the web browser installed in the personal terminal 2 to display content of the personal electronic canvas dc, the shared electronic canvas cc, and the shared electronic screen ss.

Although FIG. 1 illustrates a case where the remote meeting is held between two sites (e.g., the conference room X and the home Y), this is just an example. In another example, a meeting is held in one site or a remote meeting is performed in three or more sites.

Figure 2:
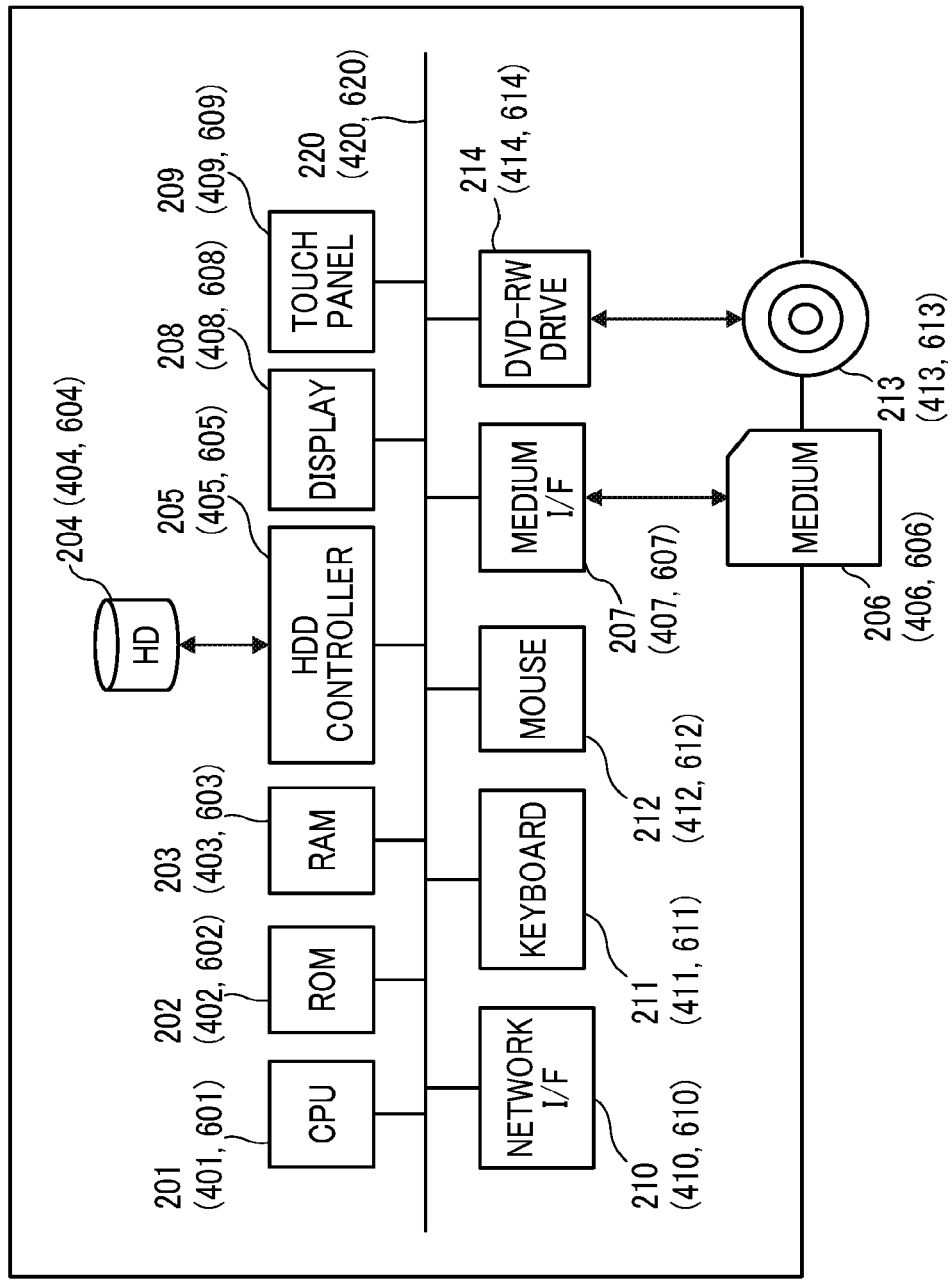
FIG. 2 is a block diagram illustrating an example of a hardware configuration of a personal terminal, a shared terminal, and a content management server of the information sharing system, according to an embodiment of the present disclosure.

Hardware Configuration:

With reference to FIG. 2, a description is given of an example of a hardware configuration of the personal terminal 2, the shared terminal 4, and the content management server 6 of the information sharing system. FIG. 2 is a block diagram illustrating an example of a hardware configuration of the personal terminal 2, the shared terminal 4, and the content management server 6 of the information sharing system.

Hardware Configuration of Personal Terminal:

As illustrated in FIG. 2, the personal terminal 2 includes a central processing unit (CPU) 201, a read only memory (ROM) 202, a random access memory (RAM) 203, a hard disk (HD) 204, a hard disk drive (HDD) controller 205, a storage medium 206, a medium interface (I/F) 207, a display 208, a touch panel 209, a network I/F 210, a keyboard 211, a mouse 212, a digital versatile disc rewritable (DVD-RW) drive 214, and a bus line 220.

The CPU 201 controls entire operation of the personal terminal 2. The ROM 202 stores a program to boot the CPU 201. The RAM 203 is used as a work area for the CPU 201. The HD 204 stores various data such as a control program. The HDD controller 205 controls reading and writing of various data from and to the HD 204 under control of the CPU 201. The medium I/F 207 controls reading and writing (storing) of data from and to the storage medium 206 such as a flash memory. The display 208 displays various information such as a cursor, menu, window, character, or image. The touch panel 209 is one example of an input device (input means) that allows a user to operate the personal terminal 2 by touching a screen of the display 208. The network I/F 210 is an interface that controls communication of data through the communication network 9. The keyboard 211 is one example of an input device (input means) provided with a plurality of keys for allowing a user to input characters, numerals, or various instructions. The mouse 212 is one example of an input device (input means) that allows a user to select a particular instruction or execution, select a target for processing, or move a cursor being displayed. The DVD-RW drive 214 reads and writes various data to and from a DVD-RW 213, which is one example of a removable storage medium.

Any one of the display 208, the touch panel 209, the keyboard 211, and the mouse 212 may be provided separately from the personal terminal 2 as long as the personal terminal 2 is capable of interacting with the user.

Hardware Configuration of Shared Terminal and Content Management Server:

The shared terminal 4 includes a CPU 401, a ROM 402, a RAM 403, an HD 404, an HDD controller 405, a storage medium 406, a medium I/F 407, a display 408, a touch panel 409, a network I/F 410, a keyboard 411, a mouse 412, a DVD-RW drive 414, and a bus line 420. Since these hardware elements are the same or substantially the same as the CPU 201, ROM 202, RAM 203, the HD 204, the HDD controller 205, the storage medium 206, the medium I/F 207, the display 208, the touch panel 209, the network I/F 210, the keyboard 211, the mouse 212, the DVD-RW drive 214, and the bus line 220, redundant descriptions thereof are omitted below.

The content management server 6 includes a CPU 601, a ROM 602, a RAM 603, an HD 604, an HDD controller 605, a storage medium 606, a medium I/F 607, a display 608, a touch panel 609, a network I/F 610, a keyboard 611, a mouse 612, a DVD-RW drive 614, and a bus line 620. Since these hardware elements are the same or substantially the same as the CPU 201, ROM 202, RAM 203, the HD 204, the HDD controller 205, the storage medium 206, the medium I/F 207, the display 208, the touch panel 209, the network I/F 210, the keyboard 211, the mouse 212, the DVD-RW drive 214, and the bus line 220, redundant descriptions thereof are omitted below. The content management server 6 may not include the touch panel 609.

Instead of the DVD-RW drive, a compact disc-recordable (CD-R) drive or the like can be used. Each of the personal terminal 2, the shared terminal 4 and the content management server 6 can be configured by a single computer or a plurality of computers to which divided portions (functions, means, or storages) are arbitrarily allocated.

Figure 3A:
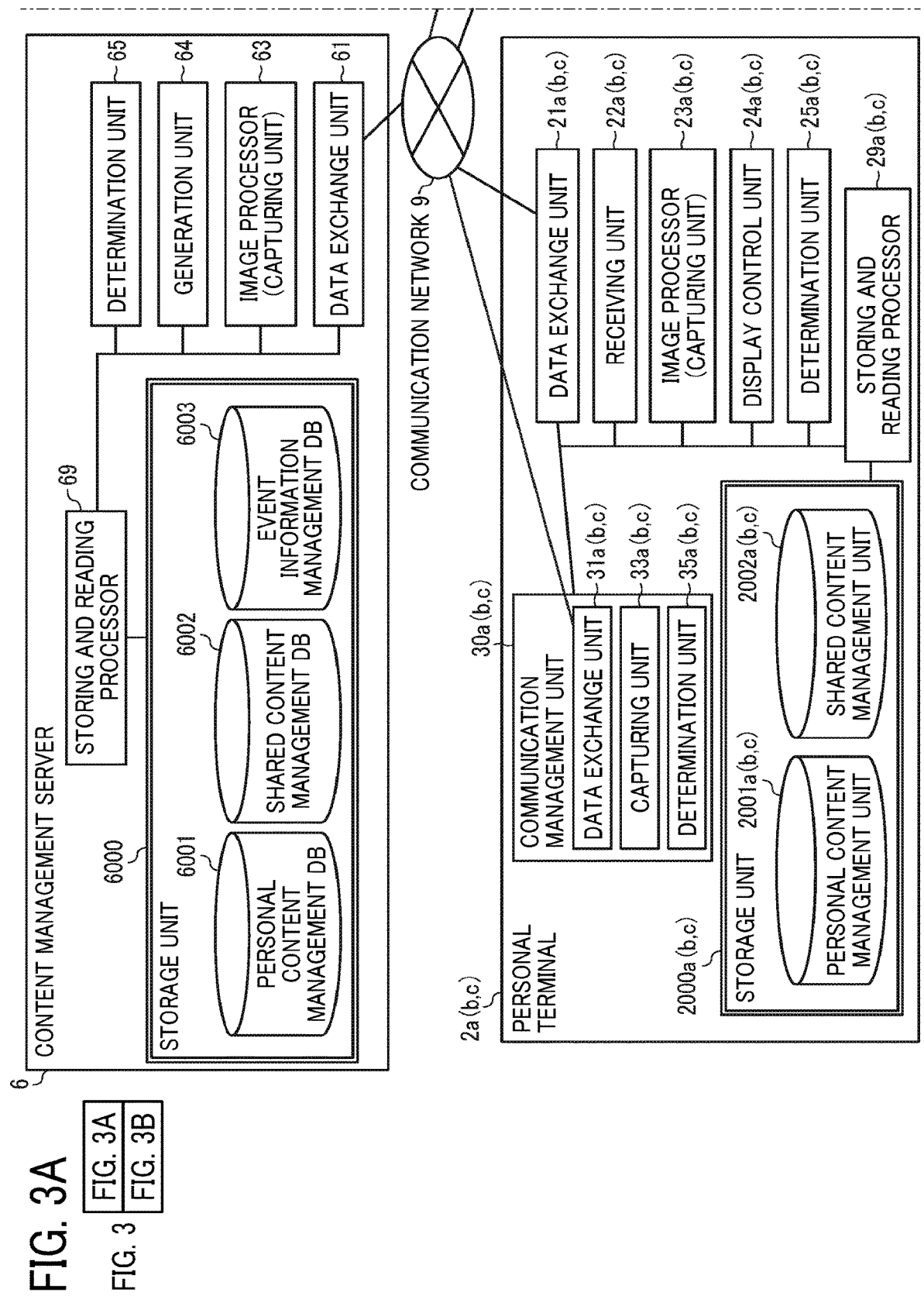
FIG. 3A and FIG. 3B are block diagrams illustrating an example of a functional configuration of the personal terminal, the shared terminal, and the content management server of the information sharing system, according to an embodiment of the present disclosure.
Figure 3B:
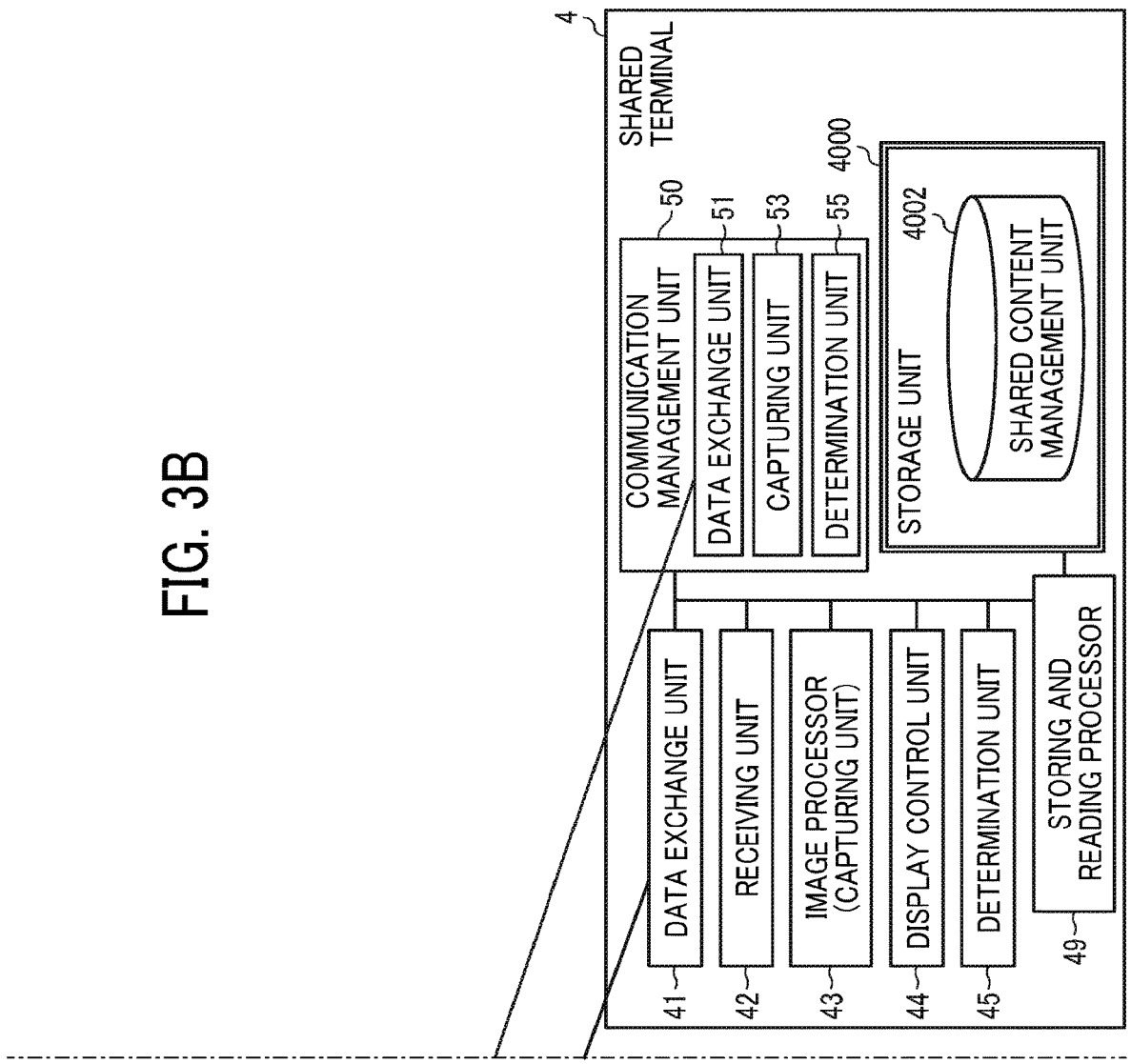

Functional Configuration:

With reference to FIG. 3A and FIG. 3B, a description is given of an example of a functional configuration of each of the personal terminal 2, the shared terminal 4, and the content management server 6 of the information sharing system. FIG. 3A and FIG. 3B are block diagrams illustrating an example of a functional configuration of the personal terminal 2, the shared terminal 4, and the content management server 6 of the information sharing system.

Functional Configuration of Personal Terminal:

First, a description is given of an example of a functional configuration of the personal terminal 2a. As illustrated in FIG. 3A, the personal terminal 2a includes a data exchange unit 21a, a receiving unit 22a, an image processor 23a, a display control unit 24a, a determination unit 25a, a storing and reading processor 29a, and a communication management unit 30a. These units are functions that are implemented by or means that are caused to function by operating any of the hardware elements illustrated in FIG. 2 in cooperation with the instructions of the CPU 201 according to the control program expanded from the HD 204 to the RAM 203. The personal terminal 2a further includes a storage unit 2000a, which is implemented by the RAM 203 and the HD 204 illustrated in FIG. 2.

The data exchange unit 21a, the receiving unit 22a, the image processor 23a, the display control unit 24a, the determination unit 25a, and the storing and reading processor 29a are implemented by the web browser (the web application of the web browser) that displays an operation display area described below. The communication management unit 30a is implemented by a dedicated communication application.

Personal Content Management DB:

FIG. 4A is a conceptual diagram illustrating an example data structure of a personal content management table. The storage unit 2000a of the personal terminal 2a stores a personal content management database (DB) 2001a implemented by the personal content management table as illustrated in FIG. 4A. Since the personal content management DB 2001a is generated for each personal electronic canvas (URL) to be displayed by the web browser in a cache of the web browser, the personal content management DB 2001a is present only while the web browser is activated.

Data stored in the personal content management table is the same as data stored for each of the personal terminals 2 in a personal content management DB 6001 described below of the content management server 6. For example, the personal terminal 2a acquires data for the personal terminal 2a from among the data for each of the personal terminals 2 stored in the content management server 6 and stores the acquired data in the personal content management DB 2001a.

In the personal content management table, a uniform resource locator (URL) specifying an access location (position) of the personal electronic canvas and a user identification (ID) identifying a user of the corresponding personal electronic canvas are specified for each event ID. Further, the personal content management table stores a content ID, data of a content, display position information of the content, and a content creation date/time, in association with each other. The event ID is an example of event identification information for identifying each event. The content ID is an example of content identification information for identifying each content. Examples of the data of a content include text data, image data such as screen capture image data, and vector data obtained by drawing. The display position information indicates a display position of the content on the personal electronic canvas. This display position indicates a position where the corresponding content is displayed on the personal electronic canvas as an infinite canvas. The content creation date/time indicates a date/time when the content data was created. In a case where a screen capturing has been performed, the creation date/time indicates a date/time when the screen capturing was performed.

The URL is an example of location identifying information. Examples of the location identifying information further include a uniform resource identifier (URI).

Shared Content Management DB:

FIG. 4B is a conceptual diagram illustrating an example data structure of a shared content management table. The storage unit 2000a of the personal terminal 2a stores a shared content management DB 2002a implemented by the shared content management table as illustrated in FIG. 4B. Since the shared content management DB 2002a is generated for each shared electronic canvas (URL) to be displayed by the web browser in the cache of the web browser, the shared content management DB 2002a is present only while the web browser is activated.

Data stored in the shared content management table is the same as data stored in a shared content management DB 6002 described below of the content management server 6. For example, the personal terminal 2a acquires the data stored in the shared content management DB 6002 of the content management server 6 and stores the acquired data in the shared content management DB 2002a.

The shared content management table specifies, for each event ID identifying an event, a URL specifying an access location (position) of the shared electronic canvas. Further, the shared content management table stores a content ID, data of a content, display position information of the content, and a content creation date/time, in association with each other. The same description given above with reference to FIG. 4A of the even ID, the content ID, the data of a content, the display position information and the content creation date/time of the personal content management table applies to the content ID, the content data, the display position information and the content creation date/time of the shared content management table, and therefore redundant descriptions thereof are omitted below.

Each Functional Unit of Personal Terminal:

Next, a detailed description is given of each functional unit of the personal terminal 2a.

The data exchange unit 21a transmits and receives various data (or information) to and from other terminals, apparatuses, servers, etc. through the communication network 9. For example, the data exchange unit 21a receives, from the content management server 6, content data described in a hypertext markup language (HTML), Cascading Style Sheet (CSS), and JavaScript (registered trademark). In addition, the data exchange unit 21a transmits operation information input by the user to the content management server 6.

The receiving unit 22a receives various selections or instructions input by the user using the keyboard 211 and the mouse 212.

The image processor 23a performs processing such as generating vector data (or stroke data) according to drawing by the user, for example. The image processor 23a further has a function as a capturing unit. For example, the image processor 23a performs screen capturing of an operation display area 132c described below, to capture image data of a screen.

The display control unit 24a controls the display 208 to display contents of various images and screens.

The determination unit 25a performs various determinations.

The storing and reading processor 29a is implemented by the HDD controller 205, the medium I/F 207 and the DVD-RW drive 214, which operate in accordance with instructions of the CPU 201 illustrated in FIG. 2. The storing and reading processor 29a stores various types of data in the storage unit 2000a, the storage medium 206 and the DVD-RW 213. Further, the storing and reading processor 29a reads out various types of data from the storage unit 2000a, the storage medium 206 and the DVD-RW 213.

The communication management unit 30a, which is implemented mainly by instructions of the CPU 201 illustrated in FIG. 2, performs data input/output with the data exchange unit 21a, etc. The communication management unit 30a further includes a data exchange unit 31a, a capturing unit 33a, and a determination unit 35a. The data exchange unit 31a transmits and receives various data (or information) to and from the content management server 6 through the communication network 9 independently of the data exchange unit 21a. The capturing unit 33a has the same or substantially the same function as the image processor 23a as the capturing unit. For example, the capturing unit 33a performs screen capturing of the operation display area 132a described below to capture image data of the screen. The determination unit 35a performs various determinations such as determining whether the operation display area 132a for the shared electronic screen is displayed on the display 208 of the personal terminal 2a.

The personal terminal 2b includes a data exchange unit 21b, a receiving unit 22b, an image processor 23b, a display control unit 24b, a determination unit 25b, a storing and reading processor 29b, and a communication management unit 30b. The personal terminal 2c includes a data exchange unit 21c, a receiving unit 22c, an image processor 23c, a display control unit 24c, a determination unit 25c, a storing and reading processor 29c, and a communication management unit 30c. These units are functions that are implemented by or means that are caused to function by operating any of the hardware elements illustrated in FIG. 2 in cooperation with the instructions of the CPU 201 according to the control program expanded from the HD 204 to the RAM 203. The personal terminal 2b and the personal terminal 2c further include a storage unit 2000b and a storage unit 2000c, respectively, each of which is implemented by the RAM 203 and the HD 204 illustrated in FIG. 2. The functions of the data exchange units 21b and 21c, the receiving units 22b and 22c, the image processors 23b and 23c, the display control units 24b and 24c, the determination units 25b and 25c, the storing and reading processors 29b and 29c, the communication management units 30b and 30c, and the storage units 2000b and 2000c are the same or substantially the same as those of the data exchange unit 21a, the receiving unit 22a, the image processor 23a, the display control unit 24a, the determination unit 25a, the storing and reading processor 29a, the communication management unit 30a and the storage unit 2000a of the personal terminal 2a respectively, and therefore redundant description thereof are omitted below. Further, the communication management unit 30b includes a data exchange unit 31b, a capturing unit 33b, and a determining unit 35b. Similarly, the communication management unit 30c includes a data exchange unit 31c, a capturing unit 33c, and a determination unit 35c. The functions of the data exchange units 31b and 31c, the capturing units 33b and 33c, and the determination units 35b and 35c are the same or substantially the same as those of the data exchange unit 31a, the capturing unit 33a, and the determination unit 35a of the communication management unit 30a, and therefore redundant descriptions thereof are omitted below.

Further, the storage unit 2000b of the personal terminal 2b stores a personal content management DB 2001b and a shared content management DB 2002b. The storage unit 2000c of the personal terminal 2c stores a personal content management DB 2001c and a shared content management DB 2002c. The personal content management DBs 2001b and 2001c and the shared content management DBs 2002b and 2002c have the same or substantially the same data structures as the personal content management DB 2001a and the shared content management DB 2002a, respectively, and therefore redundant descriptions thereof are omitted below.

Functional Configuration of Shared Terminal:

A description is now given of an example of a functional configuration of the shared terminal 4. As illustrated in FIG. 3B, the shared terminal 4 includes a data exchange unit 41, a receiving unit 42, an image processor 43, a display control unit 44, a determination unit 45, a storing and reading processor 49, and a communication management unit 50. These units are functions that are implemented by or means that are caused to function by operating any of the hardware elements illustrated in FIG. 2 in cooperation with the instructions of the CPU 401 according to the control program expanded from the HD 404 to the RAM 403. The shared terminal 4 further includes a storage unit 4000, which is implemented by the RAM 403 and the HD 404 illustrated in FIG. 2. The functions of the data exchange unit 41, the receiving unit 42, the image processor 43, the display control unit 44, the determination unit 45, the storing and reading processor 49, the communication management unit 50, and the storage unit 4000 of the shared terminal 4 are the same or the substantially the same as those of the data exchange unit 21a, the receiving unit 22a, the image processor 23a, the display control unit 24a, the determination unit 25a, the storing and reading processor 29a, the communication management unit 30, and the storage unit 2000a of the personal terminal 2a respectively, and therefore redundant descriptions thereof are omitted below. The communication management unit 30 further includes a data exchange unit 51, a capturing unit 53, and a determination unit 55. Since the functions of the data exchange unit 51, the capturing unit 53, and the determination unit 55 are the same or the substantially the same as those of the data exchange unit 31*a*, the capturing unit 33*a*, and the determination unit 35*a*, respectively, redundant descriptions thereof are omitted below.

Further, the storage unit 4000 of the shared terminal 4 stores a shared content management DB 4002. Since the shared content management DB 4002 has the same or substantially the same data structure as the shared content management DB 2002*a* of the personal terminal 2*a*, a redundant description thereof is omitted below.

The data exchange unit 41, the receiving unit 42, the image processor 43, the display control unit 44, the determination unit 45, and the storing and reading processor 49 are implemented by the web browser (the web application of the web browser) that displays the operation display area described below. The communication management unit 50 is implemented by a dedicated communication application.

Functional Configuration of Content Management Server:

A description is now given of an example of a functional configuration of the content management server 6. As illustrated in FIG. 3A, the content management server 6 includes a data exchange unit 61, an image processor 63, a generation unit 64, a determination unit 65, and a storing and reading processor 69. These units are functions that are implemented by or means that are caused to function by operating any of the hardware elements illustrated in FIG. 2 in cooperation with the instructions of the CPU 601 according to the control program expanded from the HD 604 to the RAM 603. The content management server 6 further includes a storage unit 6000, which is implemented by the RAM 603 and the HD 604 illustrated in FIG. 2.

The storage unit 6000 of the content management server 6 stores the personal content management DB 6001 and the shared content management DB 6002. The personal content management DB 6001 and the shared content management DB 6002 have the same or substantially the same data structures as the personal content management DB 2001*a* and the shared content management DB 2002*a*, respectively, and therefore redundant descriptions thereof are omitted below. However, the personal content management DB 6001 stores all data of the personal content management DBs 2001*a*, 2001*b*, and 2001*c*. Further, the shared content management DB 6002 has all data of the shared content management DBs 2002*a*, 2002*b*, 2002*c* and the shared content management DB 4002.

Event Information Management DB:

FIG. 4C is a conceptual diagram illustrating an example data structure of an event information management table. The storage unit 6000 of the content management server 6 stores an event information management DB 6003 implemented by the event information management table as illustrated in FIG. 4C. Data stored in the event information management table is acquired from a server in which schedules are registered, or registered by an organizer at a meeting, for example.

Event information is stored in the event information management table. The event information is information associating an event ID, an event name, an event date/time, an event location, an organizer ID (and an organizer's name), and a participant ID (and a participant's name) with one another. The event ID is an example of event identification information for identifying an event such as a conference or a meeting. The event name indicates a name of a conference or a meeting, for example. The event date/time indicates a date and time when the event is held. The event location indicates a location where the event is held. The organizer ID is an example of organizer identification information for identifying an organizer of the event. The organizer's name indicates a name of the organizer. The participant ID is an example of participant identification information for identifying a participant who participates in the event. The organizer is excluded from the participants. The participant's name indicates a name of the participant.

Each Functional Unit of Content Management Server:

Next, a detailed description is given of each functional unit of the content management server 6.

The data exchange unit 61 transmits and receives various data (or information) to and from other terminals, apparatuses, servers, etc. through the communication network 9.

The image processor 63 has a function as a capturing unit. For example, the image processor 63 performs screen capturing of the shared electronic canvas cc described below to capture image data of the screen.

The generation unit 64 generates various data (information). For example, the generation unit 64 generates a content ID which is unique.

The determination unit 65 performs various determinations. For example, the determination unit 65 determines whether the content ID has been received by the data exchange unit 61.

The storing and reading processor 69 is implemented by the HDD controller 605, the medium I/F 607 and the DVD-RW drive 614, which operate in accordance with instructions of the CPU 601 illustrated in FIG. 2. The storing and reading processor 69 stores various types of data in the storage unit 6000, the storage medium 606 and the DVD-RW 613. Further, the storing and reading processor 69 reads out various types of data from the storage unit 6000, the storage medium 606 and the DVD-RW 613.

The above described programs may be stored in a storage medium such as a CD-R or a DVD-R for domestic or overseas distribution.

Figure 5:
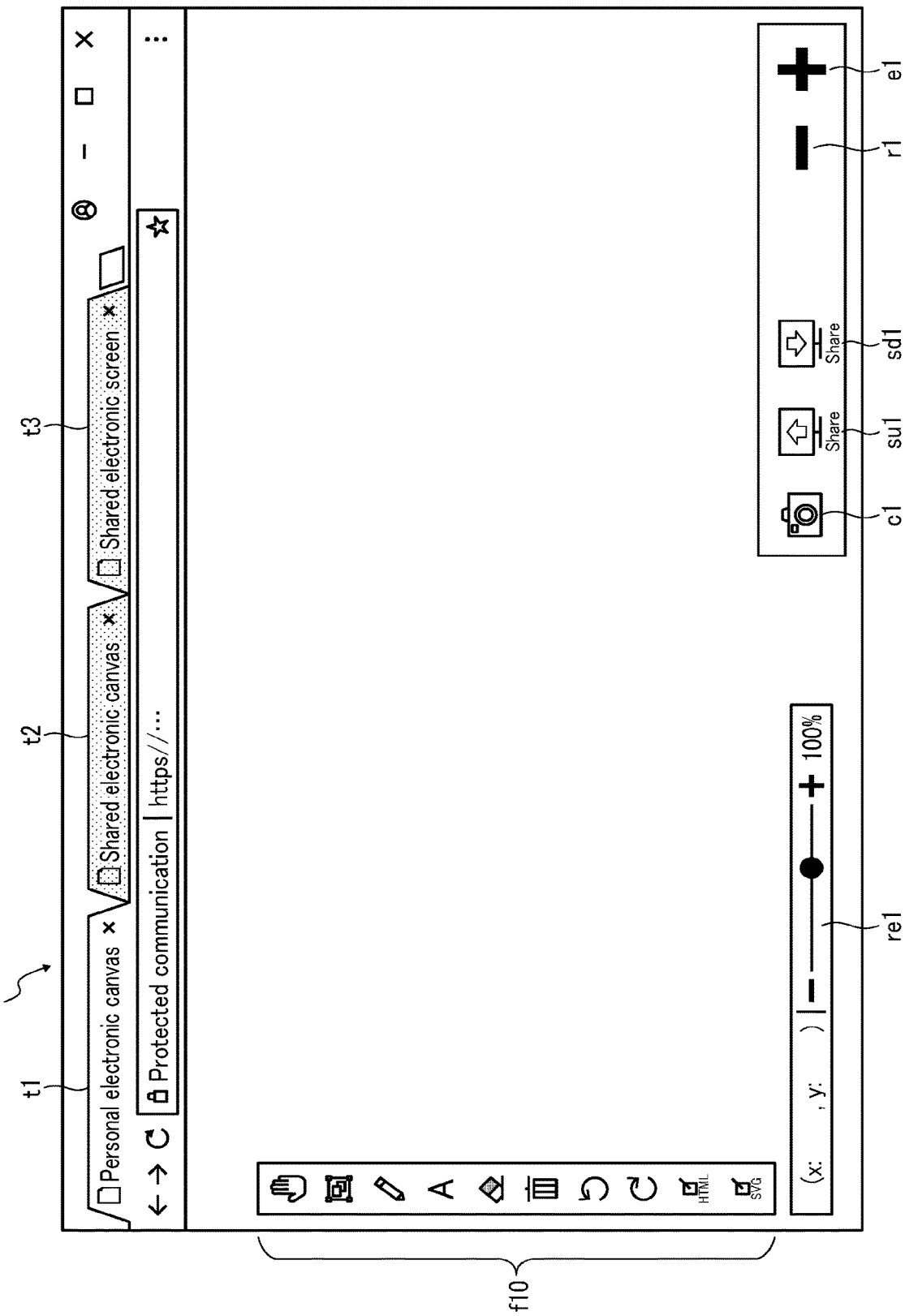
FIG. 5 is an illustration of a display example of an operation display area for displaying a personal electronic canvas, according to an embodiment of the present disclosure.
Figure 6:
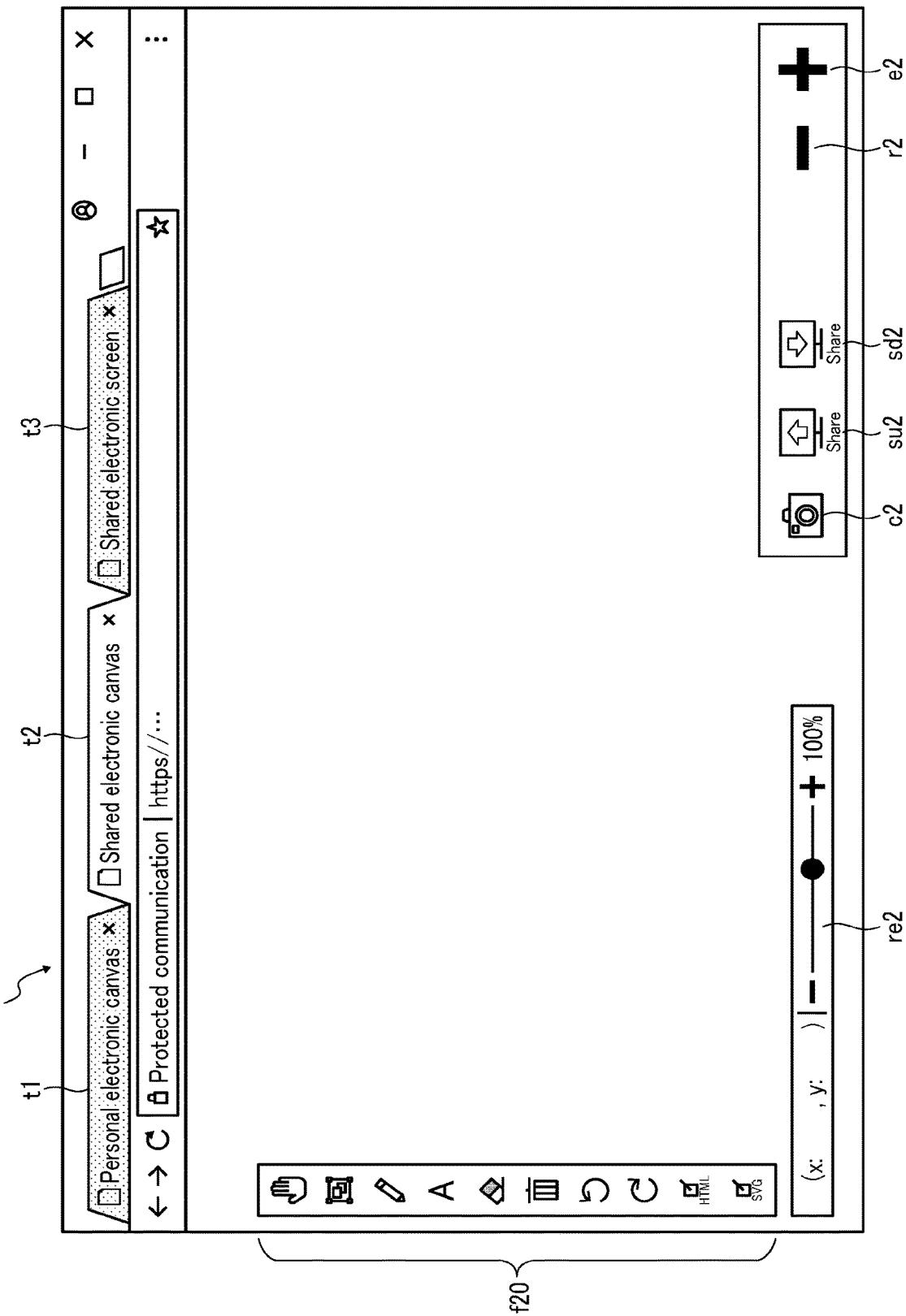
FIG. 6 is an illustration of a display example of an operation display area for displaying a shared electronic canvas, according to an embodiment of the present disclosure.
Figure 7:
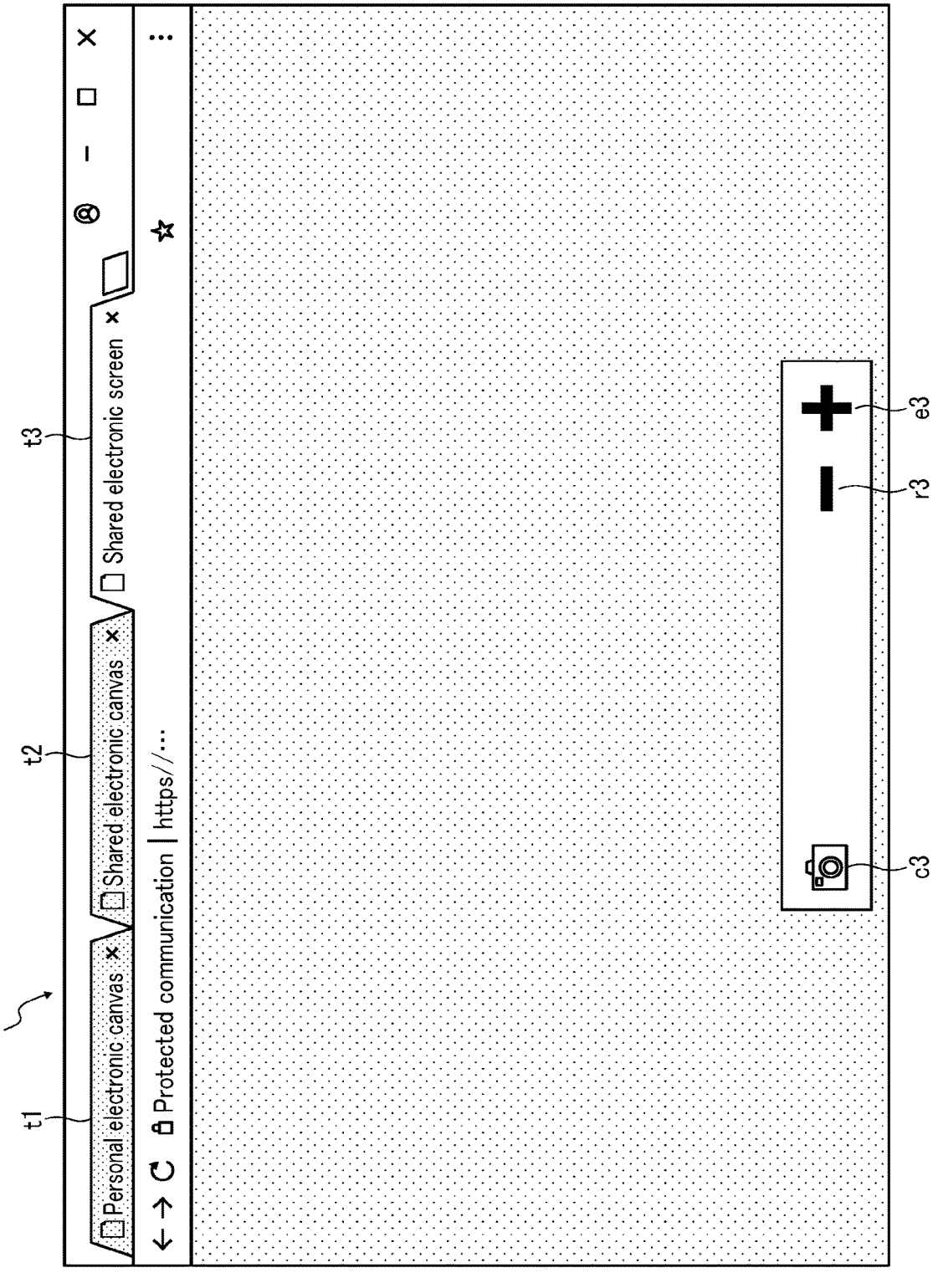
FIG. 7 is an illustration of a display example of an operation display area for displaying a shared electronic screen, according to an embodiment of the present disclosure.

Display Example of Operation Display Area:

A description is now given of display examples of operation display areas with reference to FIG. 5 to FIG. 7. The "operation display area" refers to an area on a screen for displaying information to be presented to a user or for accepting an operation from the user with graphical user interfaces (GUIs). The operation display area is a display form of a web browser or application software. For example, Microsoft Windows (registered trademark) corresponds to the operation display area. An operation display area 110 represents a given area in the personal electronic canvas dc having an infinite space. An operation display area 120 represents a given area in the shared electronic canvas cc having an infinite space.

FIG. 5 is an illustration of a display example of the operation display area 110 for displaying the personal electronic canvas. As illustrated in FIG. 5, the operation display area 110 for displaying the personal electronic canvas is displayed in response to selection of a tab t1 labeled "Personal electronic canvas" by the user among three tabs displayed in the upper area.

On the left side of the operation display area 110, a function icon section f10 is displayed. The function icon section f10 includes various function icons such as a screen movement and a drawing pen. In the lower left portion of the operation display area 110, a scrollbar re1 specifying stepwise reduction or enlargement of displayed characters or the like is displayed. In the lower right portion of the operation display area 110, a capture button c1, an upload/share button su1, a download/share button sd1, a reduction button r1, and an enlargement button e1 are displayed.

The capture button c1 is a button, when selected, for causing the capturing unit 33c to capture a screen that is to be displayed (or has been displayed) in the operation display area for the shared electronic screen and importing and displaying the captured screen in the operation display area 110 for the personal electronic canvas. In other words, capturing of a screen of the operation display area for the shared electronic screen is initiated by pressing the button on the operation display area 110 for the personal electronic canvas, which is a destination to which image data is to be imported. In the example of FIG. 5, the capture button c1 is represented by an icon having a shape of a camera.

The upload/share button su1 a button, when selected, for uploading image data of an entire screen being displayed on the display 208 of the personal terminal 2 to the content management server 6 and expanding the uploaded image data on the shared electronic screen ss. The download/share button sd1 is a button, when selected, for downloading image data expanded on the shared electronic screen ss from the content management server 6 and displaying an image represented by the downloaded image data in the operation display area 110 for the personal electronic canvas. The reduction button r1 is a button, when selected, for reducing the proportion of the operation display area 110 in the display. The enlargement button e1 is a button, when selected, for increasing the proportion of the operation display area 110 in the display.

FIG. 6 is an illustration of a display example of the operation display area 120 for displaying the shared electronic canvas. As illustrated in FIG. 6, the operation display area 120 for displaying the sharing electronic canvas is displayed in response to selection of a tab t2 labeled "Shared electronic canvas" by the user among three tabs displayed in the upper area.

On the left side of the operation display area 120, a function icon section f20 is displayed. The function icon section 120 includes various function icons such as a screen movement and a drawing pen. In the lower left portion of the operation display area 120, a scrollbar re2 specifying stepwise reduction or enlargement of displayed characters or the like is displayed. In the lower right portion of the operation display area 120, a capture button c2, an upload/share button su2, a download/share button sd2, a reduction button r2, and an enlargement button e2 are displayed.

The capture button c2 is a button, when selected, for causing the capturing unit 33c to capture a screen that is to be displayed (or has been displayed) in the operation display area for the shared electronic screen and importing and displaying the captured screen in the operation display area 120 for the shared electronic canvas. In other words, capturing of a screen of the operation display area for the shared electronic screen is initiated by pressing the button on the operation display area 120 for the shared electronic canvas, which is a destination to which image data is to be imported. In the example of FIG. 6, the capture button c2 is represented by an icon having a shape of a camera.

The upload/share button su2 is a button, when selected, for uploading image data of a screen being displayed in the operation display area 120 for the shared electronic canvas to the content management server 6 and expanding the uploaded image data to the shared electronic screen ss. The download/share button sd2 is a button, when selected, for downloading image data expanded on the shared electronic screen ss from the content management server 6 and displaying an image represented by the downloaded image data in the operation display area 120 for the shared electronic canvas. Since the reduction button r2 and the enlargement button e2 have the same or substantially the same function as the reduction button r1 and the enlargement button e1 in the operation display area 110, respectively, redundant descriptions thereof are omitted below.

FIG. 7 is an illustration of a display example of the operation display area 130 for displaying the shared electronic screen. As illustrated in FIG. 7, the operation display area 130 for displaying the shared electronic screen is displayed in response to selection of a tab t3 labeled "Shared electronic screen" by the user among three tabs displayed in the upper area.

In the lower portion of the operation display area 130, a capture button c3, a reduction button r3 and an enlargement button e3 are displayed.

The capture button c3 is a button, when selected, for capturing a screen that is displayed in the operation display area for the shared electronic screen and importing and displaying the captured screen in the operation display area 120 for the shared electronic canvas. In other words, when capturing of a screen of the operation display area for the shared electronic screen is initiated by pressing the button on the operation display area 130 for the shared electronic screen, which is a source from which the image data is to be captured, a destination to which the image data is to be imported is the operation display area 120 for the shared electronic canvas. In the example of FIG. 7, the capture button c3 is represented by an icon having a shape of a camera.

Processes or Operation:

A description is given now of an operation or processes performed according to the present embodiment, with reference to FIG. 8 to FIG. 20.

Figure 8:
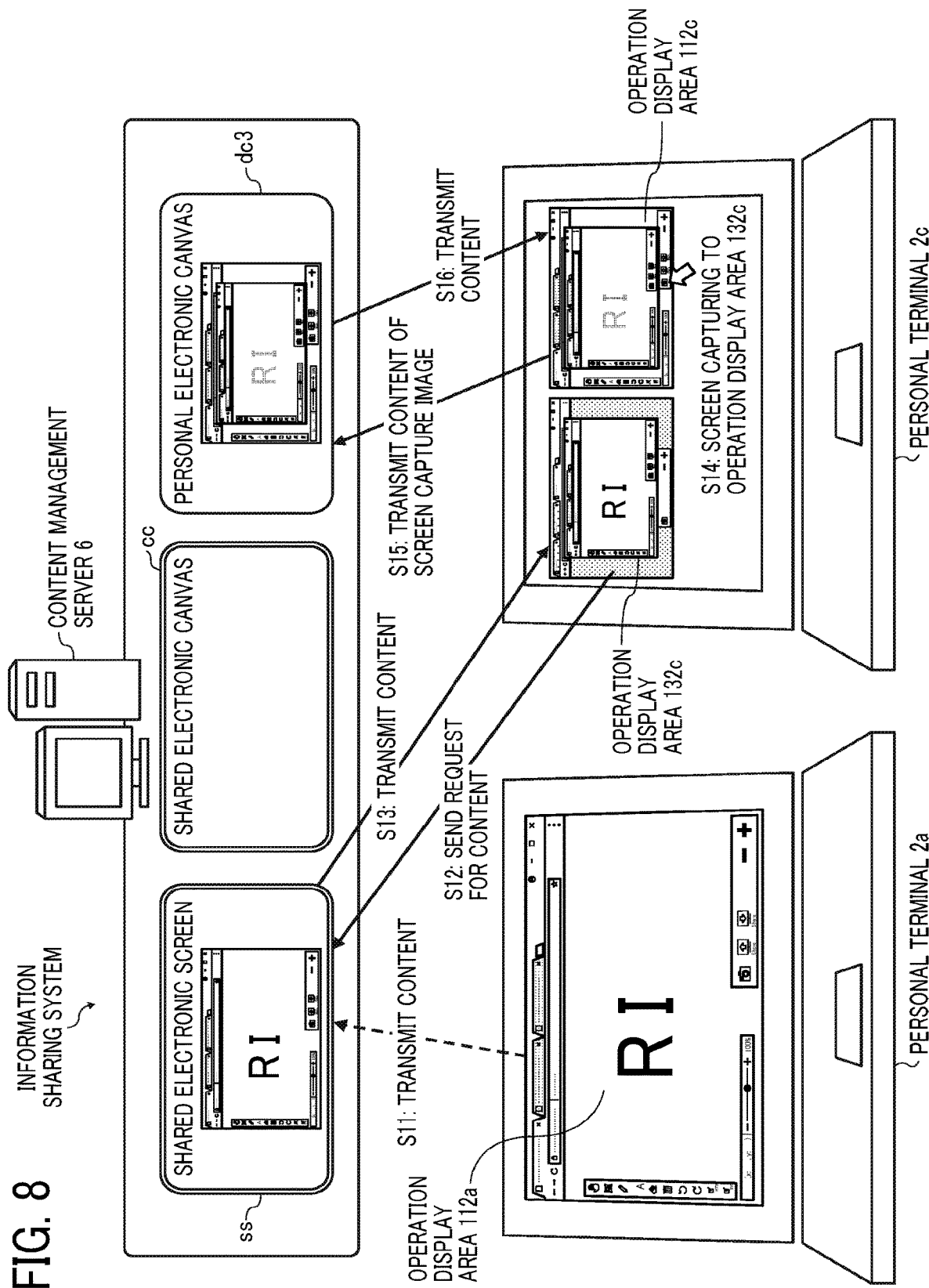
FIG. 8 is a conceptual diagram illustrating an operation of capturing content of the shared electronic screen to the personal electronic canvas by pressing a capture button on the operation display area for displaying the personal electronic canvas, according to an embodiment of the present disclosure.

Overview of First Operation or Processes:

First, with reference to FIG. 8, a description is given of an operation or processes in which the user C using the personal terminal 2c presses the capture button c1 on an operation display area 112c, which is an operation display area for displaying the personal electronic canvas, to copy content of the shared electronic screen ss to the personal electronic canvas dc3. FIG. 8 is a conceptual diagram illustrating an operation of capturing the content of the shared electronic screen into the personal electronic canvas by pressing the capture button on the operation display area for displaying the personal electronic canvas. Note that the operation display area 112c represents a given area in the personal electronic canvas dc3 having an infinite space.

FIG. 8 illustrates a state where the personal terminal 2a transmits, to the shared electronic screen ss, image data of the entire screen displayed on the display 208 of the personal terminal 2a according to the user A's instruction, to cause the screen to be shared with the personal terminal 2b, the personal terminal 2c and the shared terminal 4. In FIG. 8, a screen on which text data "RI" is input is illustrated as an example of the entire screen. Further, FIG. 8 illustrates a state in which according to the user C's instruction, the personal terminal 2c displays the content shared by the personal terminal 2a on the operation display area 132c, which is an operation display area for displaying the shared electronic screen, and thereafter copies and imports the shared content to the operation display area 112c for displaying the personal electronic canvas.

Note that in the present embodiment, the content of the entire screen is an example of particular content.

First, at the personal terminal 2a, a content "RI" is displayed on the operation display area 112a. The personal terminal 2a transmits data of content of the entire screen to the shared electronic screen ss of the content management server 6 (S11). The content management server 6 stores the data of the content of the entire screen in a storage area for the shared electronic screen ss in the storage unit 6000. The data transmitted in step S11 can be either moving image data or still image data.

Next, the user C operates the personal terminal 2c to cause the personal terminal 2c to display the operation display area 132c. Thereby, the personal terminal 2c transmits a request for data of content of the shared electronic screen ss to the content management server 6 (S12). The content management server 6 transmits data of the content of the entire screen of the shared electronic screen ss to the personal terminal 2c (S13). Thereby, at the personal terminal 2c, the content of the entire screen is displayed in the operation display area 132c by the web browser.

Further, at the personal terminal 2c, the operation display area 112c for displaying content of the personal electronic canvas dc3 is displayed.

In this state, in order to copy the content of the entire screen displayed on the operation display area 132c to the personal electronic canvas dc3 of the user C, the user C presses the capture button c1 on the operation display area 112c to perform screen capturing of the operation display area 132c different from the operation display area 112c (S14). Note that in the present embodiment, the operation display area 132c is an example of a first operation display area, and the operation display area 112c is an example of a second operation display area.

Next, the personal terminal 2c transmits data of content of the captured entire screen to the content management server 6 by the web browser displaying the operation display area 112c (S15). Then, the content management server 6 transmits the data of the content of the entire screen to the personal terminal 2c (S16). Thereby, at the personal terminal 2c, the content of the entire screen is displayed on the operation display area 112c by the web browser.

Thus, when the user C using the personal terminal 2c presses the capture button c1 on the operation display area 112c at the personal terminal 2c, the screen displayed in the operation display area 132c different from the operation display area 112c is copied to the operation display area 112c.

Figure 9:
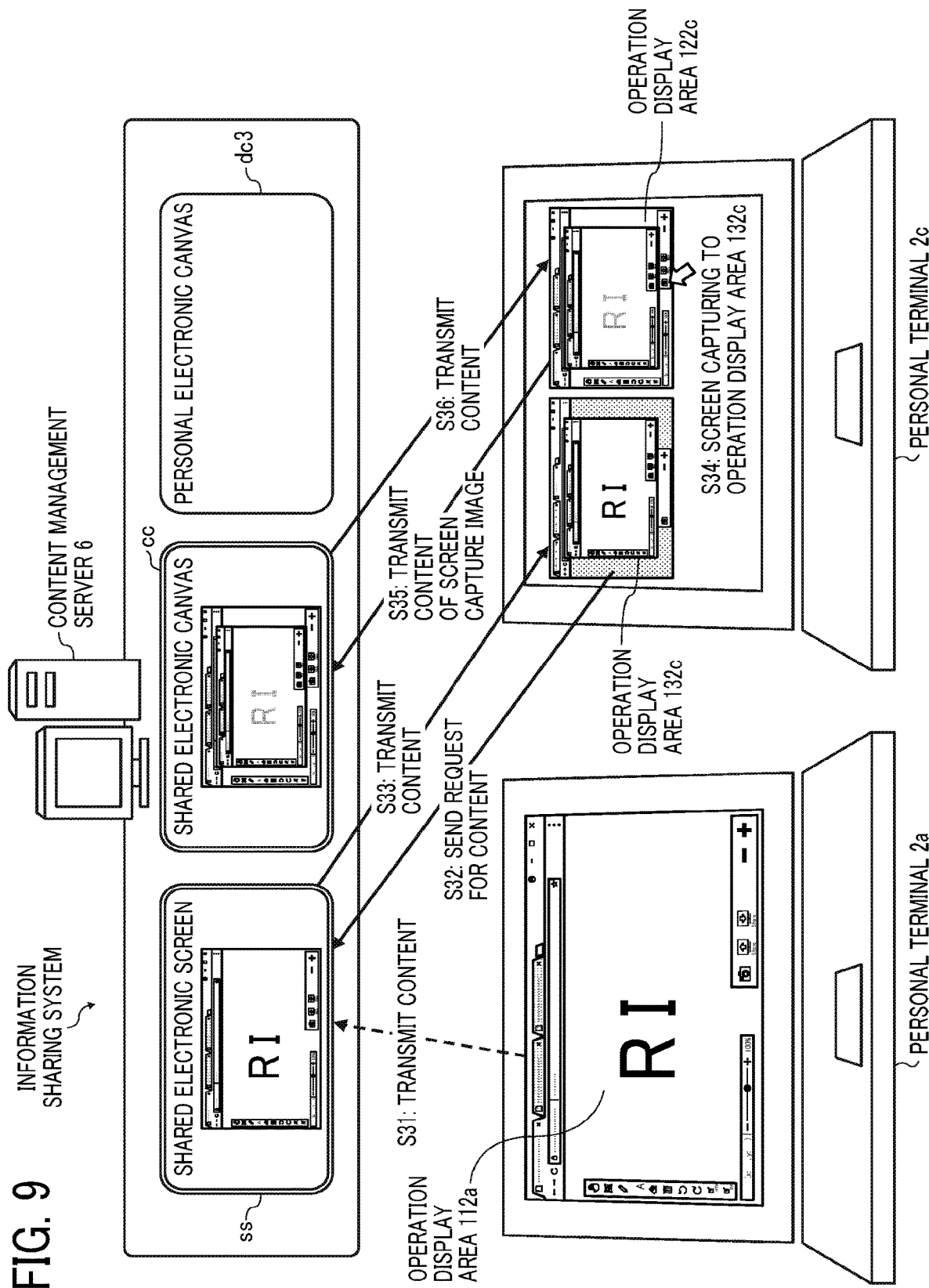
FIG. 9 is a conceptual diagram illustrating an operation of capturing content of the shared electronic screen to the shared electronic canvas by pressing a capture button on the operation display area for displaying the shared electronic canvas, according to an embodiment of the present disclosure.

Overview of Second Operation or Processes:

Next, with reference to FIG. 9, a description is given of an operation or processes in which the user C using the personal terminal 2c presses the capture button c2 on an operation display area 122c, which is an operation display area for displaying the shared electronic canvas, to copy content of the shared electronic screen ss to the shared electronic canvas cc. FIG. 9 is a conceptual diagram illustrating an operation of capturing the content of the shared electronic screen to the shared electronic canvas by pressing the capture button on the operation display area for displaying the shared electronic canvas. Note that the operation display area 122c represents a given area in the shared electronic canvas cc having an infinite space.

FIG. 9 illustrates a state where the personal terminal 2a transmits, to the shared electronic screen ss, data of content of the entire screen on which text data "RI" is displayed according to the user A's instruction, to cause the screen to be shared with the personal terminal 2b, the personal terminal 2c and the shared terminal 4. Further, FIG. 9 illustrates a state in which according to the user C's instruction, the personal terminal 2c displays the content shared by the personal terminal 2a on the operation display area 132c for the shared electronic screen, and thereafter copies and imports the shared content to the operation display area 122c for displaying the shared electronic canvas.

Note that in the present embodiment, the content of the entire screen is an example of particular content. Further, a storage location (storage area) in the storage unit 6000, which is an access destination (URL) to the shared electronic screen ss, is an example of a first location in the storage unit 6000. Further, a storage location (storage area) in the storage unit 6000, which is an access destination (URL) to the personal electronic canvas dc3, is an example of a second location in the storage unit 6000.

First, at the personal terminal 2a, a content "RI" is displayed on the operation display area 112a. The personal terminal 2a transmits data of content of the entire screen to the shared electronic screen ss of the content management server 6 (S31). The content management server 6 stores the data of the content of the entire screen in a storage area for the shared electronic screen ss in the storage unit 6000. The data transmitted in step S31 can be either moving image data or still image data.

Next, the user C operates the personal terminal 2c to cause the personal terminal 2c to display the operation display area 132c. Thereby, the personal terminal 2c transmits a request for data of content of the shared electronic screen ss to the content management server 6 (S32). The content management server 6 transmits data of the content of the entire screen of the shared electronic screen ss to the personal terminal 2c (S33). Thereby, at the personal terminal 2c, the content of the entire screen is displayed in the operation display area 132c by the web browser. The processes in steps S31 to S33 are the same or substantially the same as those in steps S11 to S13.

Further, at the personal terminal 2c, the operation display area 122c for displaying content of the shared electronic canvas cc is being displayed.

In this state, in order to copy the content of the entire screen displayed on the operation display area 132c to the shared electronic canvas cc, the user C presses the capture button c2 on the operation display area 122c to perform screen capturing of the operation display area 132c different from the operation display area 122c (S34).

Next, the personal terminal 2c transmits data of content of the captured entire screen to the content management server 6 by the web browser displaying the operation display area 122c (S35). Then, the content management server 6 transmits the data of the content of the entire screen to the personal terminal 2c (S36). Thereby, at the personal terminal 2c, the content of the entire screen is displayed on the operation display area 122c by the web browser.

As described above, when the user C using the personal terminal 2c presses the capture button c2 on the operation display area 122c at the personal terminal 2c, the screen displayed in the operation display area 132c different from the operation display area 122c is copied to the operation display area 122c.

Figure 10:
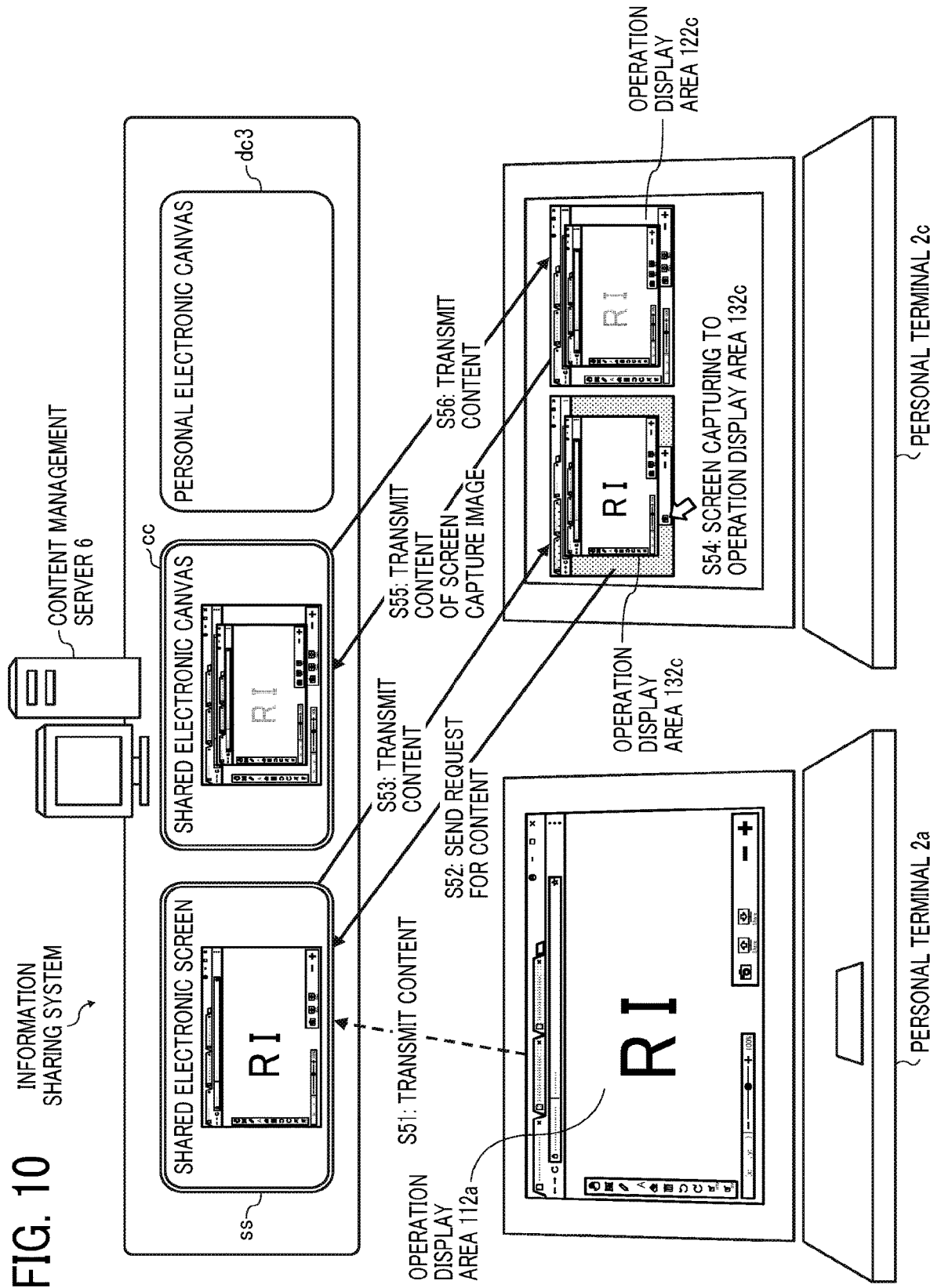
FIG. 10 is a conceptual diagram illustrating an operation of capturing content of the shared electronic screen to the shared electronic canvas by pressing a capture button on the operation display area for displaying the shared electronic screen, according to an embodiment of the present disclosure.

Overview of Third Operation or Processes:

Next, with reference to FIG. 10, a description is given of an operation or processes in which the user C using the personal terminal 2c presses the capture button c3 on an operation display area 132c, which is an operation display area for displaying the shared electronic screen ss, to copy content of the shared electronic screen ss to the shared electronic canvas cc. FIG. 10 is a conceptual diagram illustrating an operation of capturing content of the shared electronic screen to the shared electronic canvas by pressing the capture button on the operation display area for displaying the shared electronic screen.

FIG. 10 illustrates a state where the personal terminal 2a transmits, to the shared electronic screen ss, data of content of the entire screen on which text data "RI" is displayed according to the user A's instruction, to cause the screen to be shared with the personal terminal 2b, the personal terminal 2c and the shared terminal 4. Further, FIG. 10 illustrates a state in which according to the user C's instruction, the personal terminal 2c displays the content shared by the personal terminal 2a on the operation display area 132c for the shared electronic screen, and thereafter copies and imports the shared content to the operation display area 122c for displaying the shared electronic canvas.

First, at the personal terminal 2a, a content "RI" is displayed on the operation display area 112a. The personal terminal 2a transmits data of content of the entire screen to the shared electronic screen ss of the content management server 6 (S51). The content management server 6 stores the data of the content of the entire screen in a storage area for the shared electronic screen ss in the storage unit 6000. The data transmitted in step S51 can be either moving image data or still image data.

Next, the user C operates the personal terminal 2c to cause the personal terminal 2c to display the operation display area 132c. Thereby, the personal terminal 2c transmits a request for data of content of the shared electronic screen ss to the content management server 6 (S52). The content management server 6 transmits data of content of the entire screen of the shared electronic screen ss to the personal terminal 2c (S53). Thereby, at the personal terminal 2c, the content of the entire screen is displayed in the operation display area 132c by the web browser. The processes in steps S51 to S53 are the same or substantially the same as those in steps S11 to S13 (steps S31 to S33).

Further, at the personal terminal 2c, the operation display area 122c for displaying content of the shared electronic canvas cc is being displayed.

In this state, in order to copy the content of the entire screen displayed on the operation display area 132c to the shared electronic canvas cc, the user C presses the capture button c3 on the operation display area 132c to perform screen capturing of the same operation display area 132c (S54).

Next, the personal terminal 2c transmits data of content of the captured entire screen to the content management server 6 by the web browser displaying the operation display area 122c (S55). Then, the content management server 6 transmits data of content of the entire screen to the personal terminal 2c (S66). Thereby, at the personal terminal 2c, the content of the entire screen is displayed on the operation display area 122c by the web browser.

As described above, when the user C using the personal terminal 2c presses the capture button c3 on the operation display area 132c at the personal terminal 2c, the screen displayed in this operation display area 132c is copied to the operation display area 122c.

Figure 11:
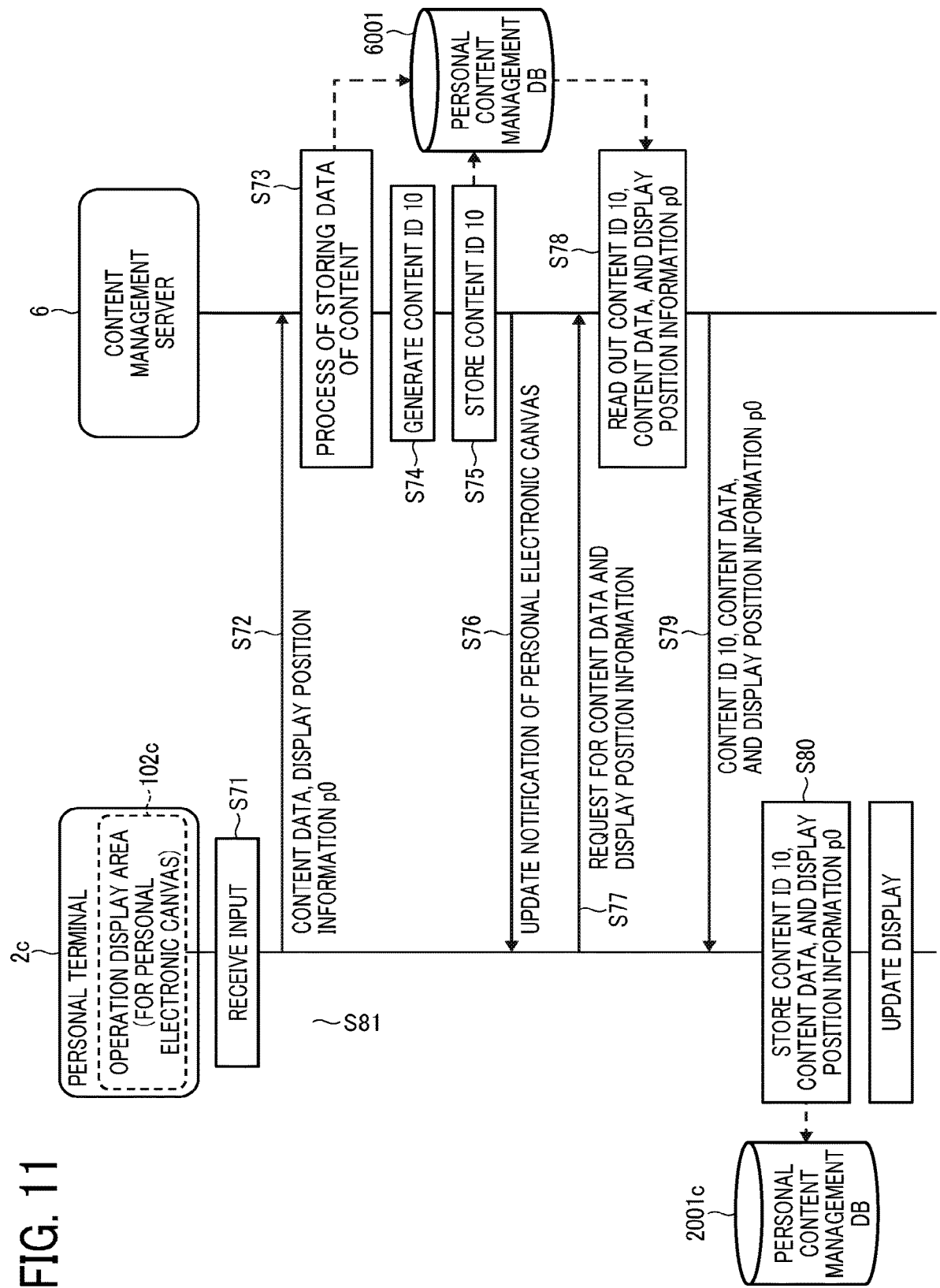
FIG. 11 is a sequence diagram illustrating an operation of inputting and displaying content, according to an embodiment of the present disclosure.

Details of Basic Operation or Processes:

Referring to FIG. 11 to FIG. 20, a detailed description is given of a basic operation or processes. FIG. 11 is a sequence diagram illustrating an operation of inputting and displaying content. Prior to describing an operation of copying content from the operation display area 132c for the shared electronic screen, a description is now given of a basic operation of displaying content of a screen element (i.e., not an entire screen) such as characters or text in the operation display area for the personal electronic canvas (in this example, the operation display area 112c of the personal terminal 2c) by using a web browser.

First, at the personal terminal 2c, when the user C inputs content of a screen element (such as a character) at a desired position on the operation display area 112c by using the keyboard 211 and the mouse 212, the receiving unit 22c receives the input (S71). Then, the data exchange unit 21c transmits, to the content management server 6, data of the content of the screen element and display position information p0 indicating a display position of the content in the personal electronic canvas dc3 (S72). The data exchange unit 61 of the content management server 6 receives the data of the content and the display position information p0.

Next, the storing and reading processor 69 of the content management server 6 stores the content data and the display position information p0 in association with each other in the personal content management table in which an URL of the personal electronic canvas dc3 is managed in the personal content management DB 6001 (S73). Then, the generation unit 64 generates a unique content ID 10 (S74).

Next, the storing and reading processor 69 stores the content ID 10 generated in step S74 in association with the content data and the display position information p0 stored in step S73 (S75).

Next, the data exchange unit 61 transmits an update notification, which is a notification indicating an update of the personal electronic canvas, to the personal terminal 2c (S76). In a case where the user C has plural personal terminals 2 and accesses the same personal electronic canvas (URL) from the plural personal terminals 2, the content management server 6 sends the update notification to each of the plural personal terminals 2 of the user C. Thereby, at the web browser displaying the operation display area 112c of the personal terminal 2c, the data exchange unit 21c receives the update notification.

Next, at the web browser displaying the operation display area 112c of the personal terminal 2c, the data exchange unit 21c transmits a request for updated content data and display position information to the content management server 6 (S77). The data exchange unit 61 of the content management server 6 receives the request.

Next, the storing and reading processor 69 of the content management server 6 reads out the content ID 10, the data of the content, and the display position information p0 corresponding to the updated content from the personal content management table for the personal electronic canvas dc3 in the personal content management DB 6001 (S78). Then, the data exchange unit 61 transmits the content ID 10, the data of the content, and the display position information p0 to the personal terminal 2c (S79). Thereby, at the web browser of the personal terminal 2c, the data exchange unit 21c receives the content ID 10, the data of the content, and the display position information p0.

Next, the storing and reading processor 29c of the personal terminal 2c stores the content ID 10, the data of the content, and the display position information p0 received in step S79 in association with each other in the personal content management DB 2001c (S80). Thereby, at the web browser of the personal terminal 2c, the display control unit 24c updates the operation display area 112c to display the content, which is the screen element such as a character (S81).

Thus, the operation of inputting and displaying the content ends.

Figure 12:
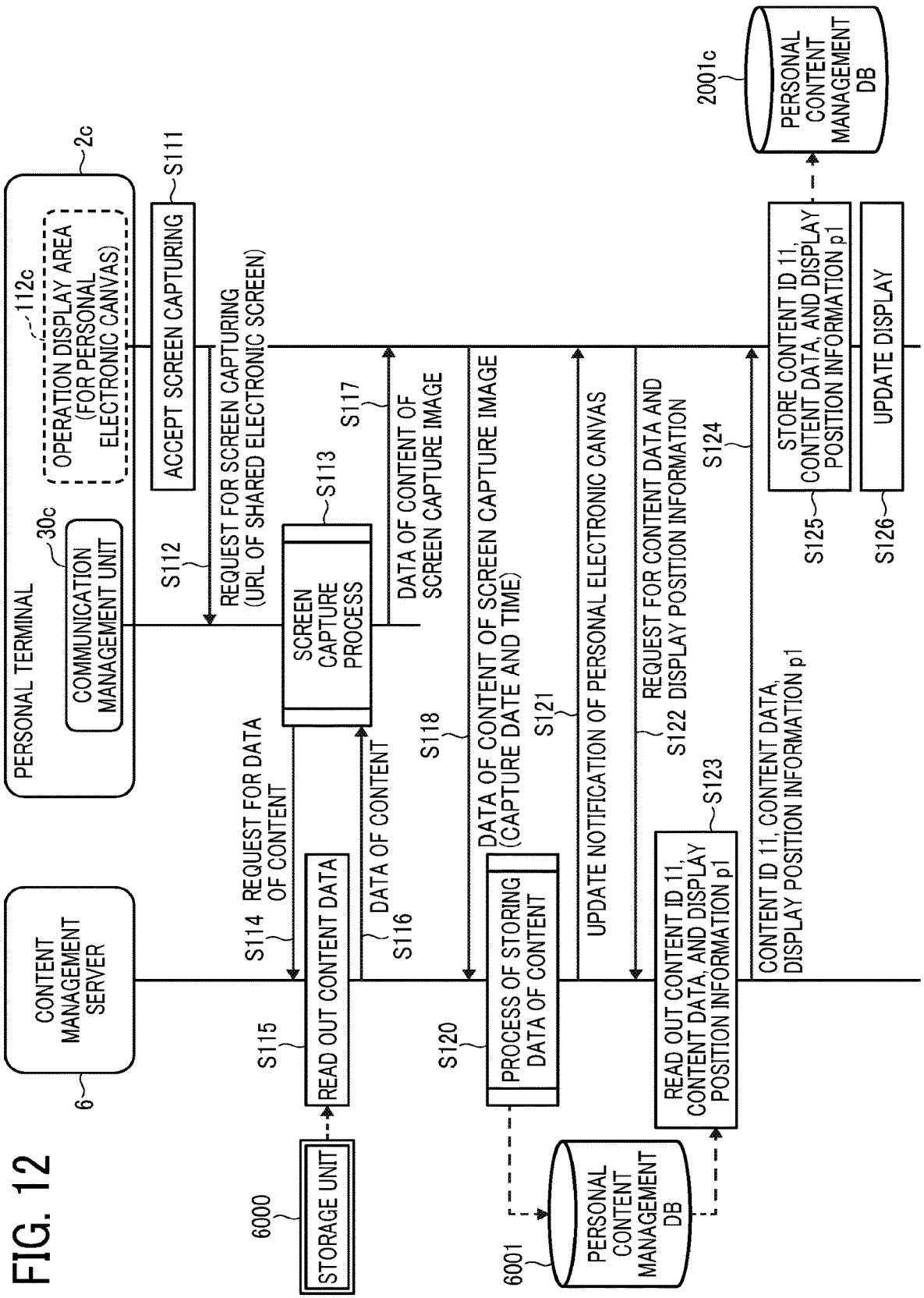
FIG. 12 is a sequence diagram illustrating an operation of capturing content of the shared electronic screen to the personal electronic canvas by pressing a capture button on the operation display area for displaying the personal electronic canvas, according to an embodiment of the present disclosure.
Figure 13:
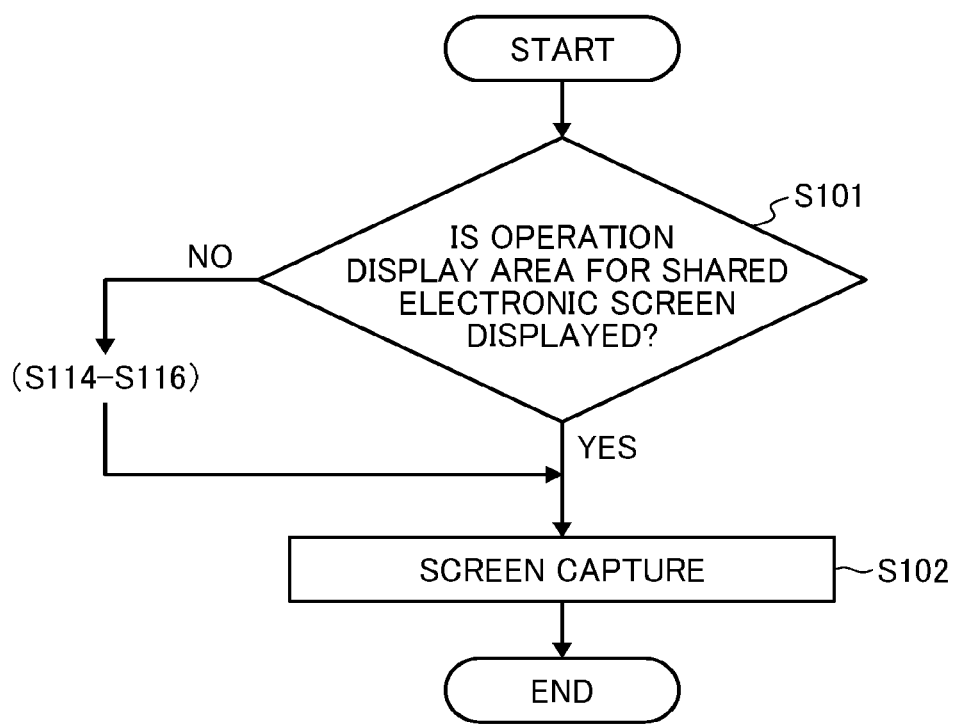
FIG. 13 is a flowchart illustrating a screen capturing process, according to an embodiment of the present disclosure.
Figure 14:
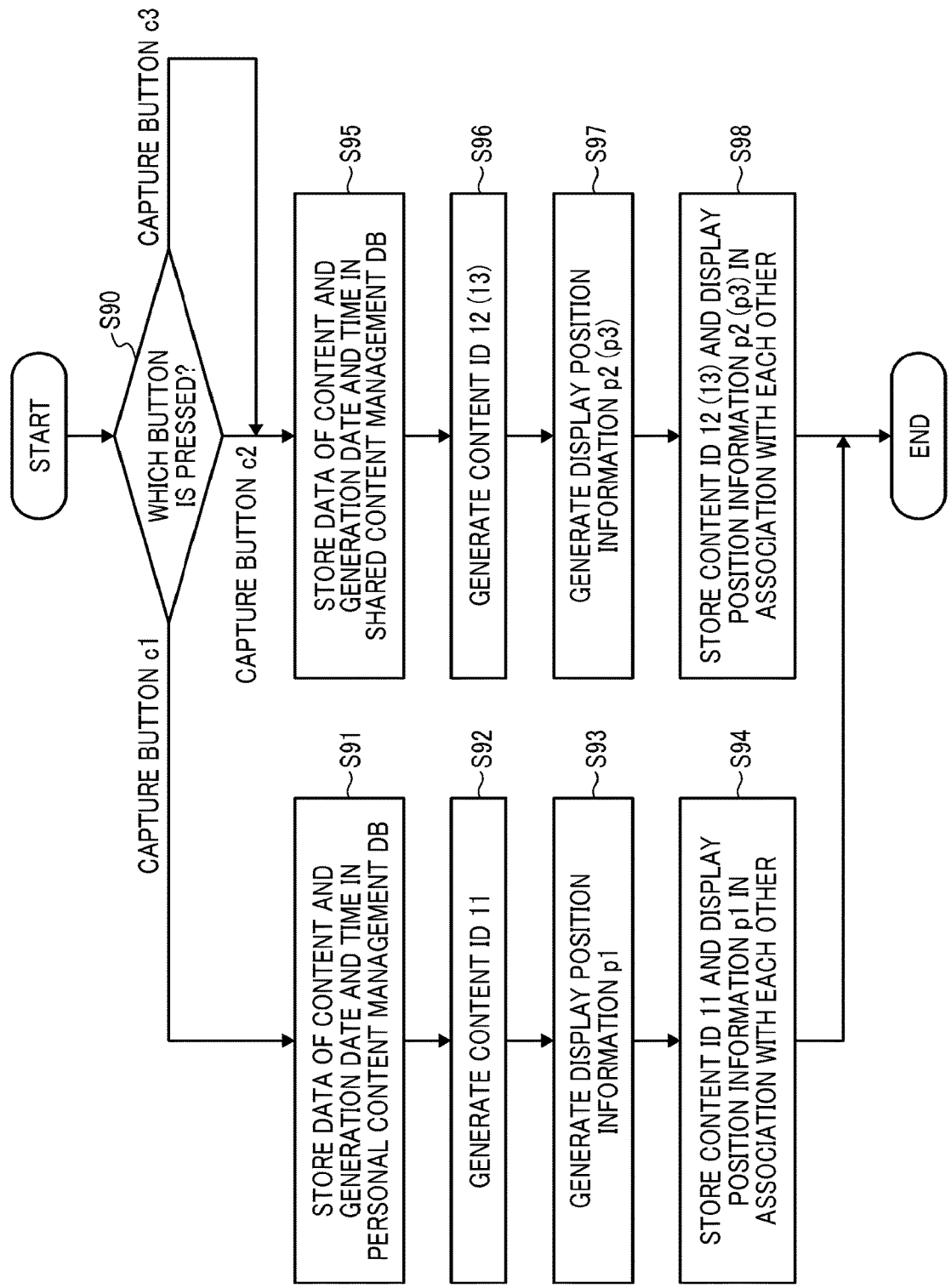
FIG. 14 is a flowchart illustrating an operation of storing data of content, according to an embodiment of the present disclosure.

Details of First Operation or Processes:

Referring to FIG. 12 to FIG. 14, a detailed description is now given of the first operation or processes illustrated in FIG. 8. More specifically, a detailed description is given of processes of step S14 performed by the personal terminal 2c and subsequent steps on the assumption that the processes of the step S13 and previous steps have already been performed.

First, when the user C presses the capture button c1 displayed in the operation display area 112c on the personal terminal 2c, the receiving unit 22c receives a screen capturing process by the web browser (the web application of the web browser) of the personal terminal 2c (S111). In response, the receiving unit 22c sends a screen capture request to the communication management unit 30c (S112). This request includes the URL of the shared electronic screen ss. The communication management unit 30c receives the screen capture request.

Next, the communication management unit 30c performs the screen capturing process (S113). A detailed description is now given of the screen capturing process with reference to FIG. 13.

First, the determination unit 35c of the communication management unit 30c determines whether the operation display area for the shared electronic screen is displayed (S101). When the determination unit 35c determines that the operation display area for the shared electronic screen is displayed, the capturing unit 33c of the communication management unit 30c performs screen capturing of the operation display area 132c to capture image data of the screen (S102). By contrast, when the determination unit 35c determines in step S101 that the operation display area for the shared electronic screen is not displayed, processes of steps S114 to S116 are performed. Specifically, in FIG. 12, the data exchange unit 31c of the communication management unit 30c transmits, to the content management server 6, request information indicating a request for data of content of the shared electronic screen ss (S114). The data exchange unit 61 of the content management server 6 receives the request information. Note that in step S101, in a case where the personal terminal 2c has already opened a display area for the shared electronic screen as a different tab t2 even when the operation display area for the shared electronic screen is not displayed, the determination unit 35c determines that the operation display area for the shared electronic screen is displayed. In addition, at step S102, in a case where the personal terminal 2c has already opened a display area for the shared electronic screen as the different tab t2 even when the operation display area for the shared electronic screen is not displayed, the capturing unit 33c receives and imports a screen to be displayed on the shared screen from the content management server 6, based on information identifying the shared screen such as a URL of the shared screen corresponding to the personal electronic canvas on which the capture button is pressed.

Then, the storing and reading processor 69 of the content management server 6 reads out data of content from the storage location (storage area) for the shared electronic screen ss in the same virtual room as a virtual room in which the operation display area 112c on which the capture button c1 is pressed in step S111 is participating in the storage unit 6000 (S115). Then, the data exchange unit 61 of the content management server 6 transmits the data of the content read by the storing and reading processor 69 to the communication management unit 30c of the personal terminal 2c (S116). The data exchange unit 31c of the communication management unit 30c receives the data of the content.

Next, the communication management unit 30c outputs data of content of the screen capture image to the data exchange unit 21c implemented by the web browser displaying the operation display area 112c (S117), whereby the data of the content of the screen capture image is input to the data exchange unit 21c.

Then, the data exchange unit 21c transmits the data of the content of the screen capture image to the content management server 6 (S118). In this step S118, the data exchange unit 21c also transmits information indicating a date and time when the screen capturing is performed in step S113. Note that the date and time when the screen capturing is performed can be a date and time when the screen capturing process is received in step S111. Thus, the data exchange unit 61 of the content management server 6 receives the data of the content of the screen capture image and the information indicating the date and time when the screen capturing is performed.

Next, the content management server 6 performs an operation of storing the data of the content (S120). A detailed description is now given of the operation of storing the data of the content with reference to FIG. 14. FIG. 14 is a flowchart illustrating the operation of storing the data of the content.

As illustrated in FIG. 14, the determination unit 65 of the content management server 6 determines which one of the capture buttons c1, c2 and c3 is pressed (S90). Specifically, when the data of the content is received by the web browser that displays the operation display area 112c with which a communication session is established, the determination unit 65 determines that the capture button c1 is pressed. Further, when the data of the content is received by the web browser that displays the operation display area 122c with which a communication session is established, the determination unit 65 determines that the capture button c2 is pressed. Furthermore, when the data of the content is received by the web browser that displays the operation display area 132c with which a communication session is established, the determination unit 65 determines that the capture button c3 is pressed.

In the case of the operation illustrated in FIG. 12, the determination unit 65 determines that the capture button c1 is pressed. Then, the storing and reading processor 69 stores the data of the content and the creation date/time (the date and time when the screen capturing is performed, in this example) in the personal content management DB 6001 (S91). Then, the generation unit 64 generates a unique content ID 11 (S92). Further, the generation unit 64 generates a display position information p1 indicating display position of the content of the screen capture image on the personal electronic canvas dc3 (S93). Although the display position of the screen capture image in the personal electronic canvas dc3 is arbitrary, when there is a screen capture image already displayed, the display position is a position below the screen capture image already displayed, for example.

Next, the storing and reading processor 69 stores the content ID generated in step S92 and the display position information p1 generated in step S93 in association with the content data stored in step S91 (S94). Thus, the process of step S120 ends.

Next, the same or substantially the same processes as those of steps S76 to S81 are performed. Specifically, the data exchange unit 61 transmits an update notification, which is a notification indicating an update of the personal electronic canvas, to the personal terminal 2c (S121). In a case where the user C has plural personal terminals 2 and accesses the same personal electronic canvas (URL) from the plural personal terminals 2, the content management server 6 sends the update notification to each of the plural personal terminals 2 of the user C. Thereby, at the web browser displaying the operation display area 112c of the personal terminal 2c, the data exchange unit 21c receives the update notification.

Next, at the web browser displaying the operation display area 112c of the personal terminal 2c, the data exchange unit 21c transmits a request for updated content data and display position information to the content management server 6 (S122). The data exchange unit 61 of the content management server 6 receives the request.

Next, the storing and reading processor 69 of the content management server 6 reads out the content ID 11, the data of the content, and the display position information p1 corresponding to the updated content from the personal content management table for the personal electronic canvas dc3 in the personal content management DB 6001 (S123). Then, the data exchange unit 61 transmits the content ID 11, the data of the content, and the display position information p1 to the personal terminal 2c (S124). Thereby, at the web browser of the personal terminal 2c, the data exchange unit 21c receives the content ID 11, the data of the content, and the display position information p1.

Next, the storing and reading processor 29c of the personal terminal 2c stores the content ID 11, the data of the content, and the display position information p1 received in step S124 in association with each other in the personal content management DB 2001c (S125). Thereby, at the web browser of the personal terminal 2c, the display control unit 24c updates the operation display area 112c to display content, which is the screen capture image (the entire screen) (S126).

Thus, the entire image displayed or to be displayed in the operation display area 132c for the shared electronic screen is captured and displayed in the operation display area 112c for the personal electronic canvas, whereby allowing the user C to import a shared image as a personal image.

Figure 15:
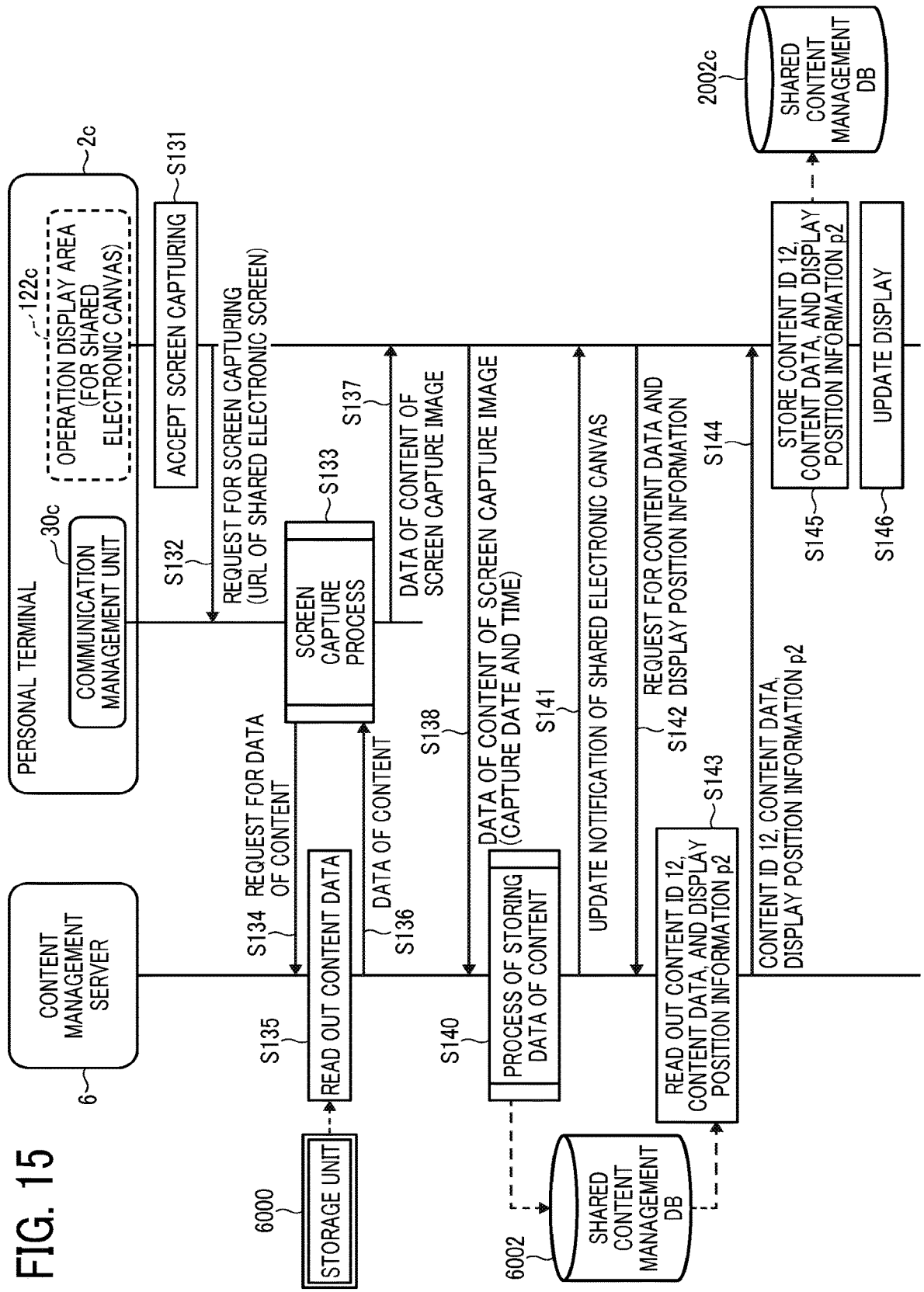
FIG. 15 is a sequence diagram illustrating an operation of capturing content of the shared electronic screen to the shared electronic canvas by pressing a capture button on the operation display area for displaying the shared electronic canvas, according to an embodiment of the present disclosure.

Details of Second Operation or Processes:

Referring to FIG. 15, a detailed description is now given of the second operation or processes illustrated in FIG. 9. More specifically, a detailed description is given of processes of step S34 performed by the personal terminal 2c and subsequent steps on the assumption that the processes of the step S33 and previous steps has already been performed. The second operation or processes is substantially the same as the first operation or processes, except that the operations on the operation display area 112c are replaced with operations on the operation display area 122c.

First, when the user C presses the capture button c2 displayed in the operation display area 122c on the personal terminal 2c, the receiving unit 22c receives a screen capturing process by the web browser (the web application of the web browser) of the personal terminal 2c (S131). In response, the receiving unit 22c sends a screen capture request to the communication management unit 30c (S132). This request includes the URL of the shared electronic screen ss. The communication management unit 30c receives the screen capture request.

Next, the communication management unit 30c performs the screen capturing process (S133). This screen capturing process is the same or substantially the same as the process described above with reference to FIG. 13, and therefore the redundant description thereof is omitted below. Note that, the processes of steps S134 to S136 of FIG. 15 are the same or substantially the same as the processes of steps 114 to S116.

Next, the communication management unit 30c outputs the data of the content of the screen capture image to the data exchange unit 21c implemented by the web browser displaying the operation display area 122c (S137), whereby the data of the content of the screen capture image is input to the data exchange unit 21c.

Then, the data exchange unit 21c transmits the data of the content of the screen capture image to the content management server 6 (S138). In this step S138, the data exchange unit 21c also transmits information indicating a date and time when the screen capturing is performed in step S133. Note that the date and time when the screen capturing is performed can be a date and time when the screen capturing process is received in step S131. Thus, the data exchange unit 61 of the content management server 6 receives the data of the content of the screen capture image and the information indicating the date and time when the screen capturing is performed.

Next, the content management server 6 performs an operation of storing the data of the content (S140). A detailed description is now given of the operation of storing the data of the content with reference to FIG. 14.

In the case of the operation illustrated in FIG. 15, in step S90, the determination unit 65 determines that the capture button c2 is pressed from among the capture buttons c1, c2 and c3. Then, the storing and reading processor 69 stores the data of the content and the creation date/time (the date and time when the screen capturing is performed, in this example) in the shared content management DB 6002 (S95). Then, the generation unit 64 generates a unique content ID 12 (S96). Further, the generation unit 64 generates display position information p2 indicating a display position of the content of the screen capture image on the shared electronic canvas cc (S97). Although the display position of the screen capture image in the shared electronic canvas cc is arbitrary, when there is a screen capture image already displayed, the display position is a position below the screen capture image already displayed, for example.

Next, in step S98, the storing and reading processor 69 stores the content ID generated in step S96 and the display position information p2 generated in step S97 in association with the content data stored in step S95. Thus, the process of step S140 ends.

Next, the same or substantially the same processes as those of steps S76 to S81 (steps S121 to S126) are performed. Specifically, the data exchange unit 61 transmits an update notification, which is a notification indicating an update of the shared electronic canvas, to the personal terminal 2c (S141). Note that when plural personal terminals 2 access the same shared electronic canvas (URL), the content management server 6 transmits the update notification to each of plural personal terminals 2. Thereby, at the web browser displaying the operation display area 122c of the personal terminal 2c, the data exchange unit 21c receives the update notification.

Next, at the web browser displaying the operation display area 122c of the personal terminal 2c, the data exchange unit 21c transmits a request for updated content data and display position information to the content management server 6 (S142). The data exchange unit 61 of the content management server 6 receives the request.

Next, the storing and reading processor 69 of the content management server 6 reads out the content ID 12, the data of the content, and the display position information p2 corresponding to the updated content from the shared content management table for the shared electronic canvas cc in the shared content management DB 6002 (S143). Then, the data exchange unit 61 transmits the content ID 12, the data of the content, and the display position information p2 to the personal terminal 2c (S144). Thereby, at the web browser of the personal terminal 2c, the data exchange unit 21c receives the content ID 12, the data of the content, and the display position information p2.

Next, the storing and reading processor 29c of the personal terminal 2c stores the content ID 12, the data of the content, and the display position information p2 received in step S144 in association with each other in the shared content management DB 2002c (S145). Thereby, at the web browser of the personal terminal 2c, the display control unit 24c updates the operation display area 122c to display content, which is the screen capture image (the entire screen) (S146).

Thus, the entire image displayed or to be displayed in the operation display area 132c for the shared electronic screen is captured and displayed in the operation display area 122c for the shared electronic canvas, whereby allowing the user C to import an image shared by the shared electronic screen as an image shared by the electronic canvas.

Figure 16:
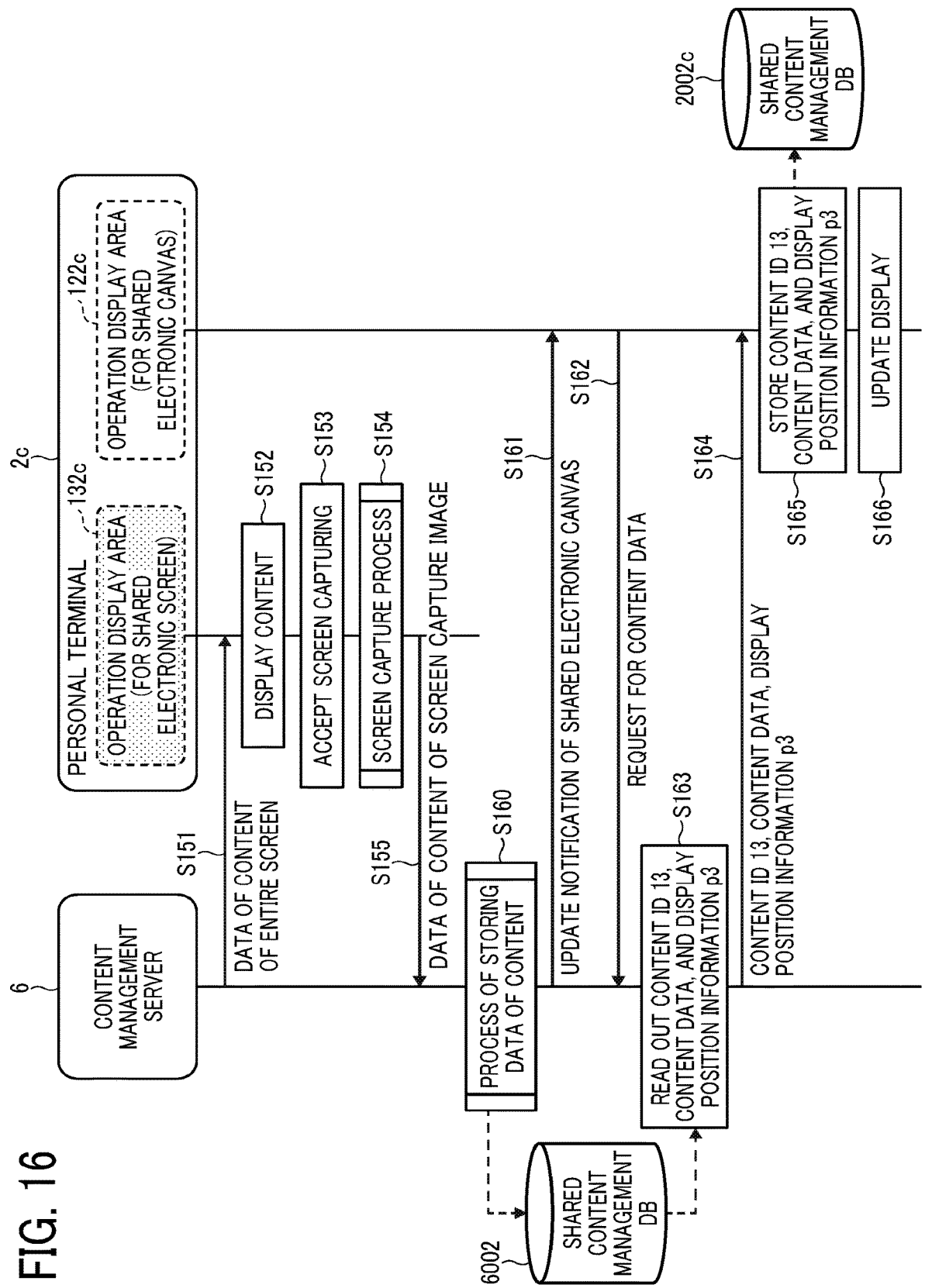
FIG. 16 is a sequence diagram illustrating an operation of capturing content of the shared electronic screen to the shared electronic canvas by pressing a capture button on the operation display area for displaying the shared electronic screen, according to an embodiment of the present disclosure.

Details of Third Operation or Processes:

Referring to FIG. 16, a detailed description is now given of the third operation or processes illustrated in FIG. 10. More specifically, a detailed description is given of processes of step S53 performed by the personal terminal 2c and subsequent steps.

First, the data exchange unit 61 of the content management server 6 transmits data of content of the entire screen of the shared electronic screen ss to the personal terminal 2c (S151). Thereby, at the web browser displaying the operation display area 132c, the data exchange unit 21c receives the data of the content of the entire screen. Then, at the web browser displaying the operation display area 132c, the display control unit 24c causes the content of the entire screen to be displayed on the operation display area 132c (S152).

In this state, when the user C presses the capture button c3 illustrated in FIG. 7, at the web browser displaying the operation display area 132c, the receiving unit 22c receives a screen capturing (S153). Since the screen capturing process of step S154 is the same or substantially the same as the process described above with reference to FIG. 13, the redundant description thereof is omitted below. However, while the determination unit 35c performs the process of step S101 in the description given above with reference to FIG. 13, the determination unit 25c performs the process of step S101 in the process of step S154. In addition, the image processor 23a functioning as a capturing unit to capture image data of a screen by performing screen capturing of the operation display area 132c performs the process of step S102. Since the operation display area for the shared electronic screen is displayed in step S152, the determination unit 25c determines in step S101 that the display operation area for the shared electronic screen is displayed (YES). Then, in step S102, at the web browser displaying the operation display area 132c, the image processor 23c performs screen capturing of the operation display area 132c itself.

Next, at the web browser displaying the operation display area 132c, the data exchange unit 21c transmits data of content of the image capture screen to the content management server 6 (S155). The data exchange unit 61 of the content management server 6 receives the data of the content of the screen capture image.

Next, the content management server 6 performs an operation of storing the data of the content (S160). A detailed description is now given of the operation of storing the data of the content with reference to FIG. 14.

In the case of the operation illustrated in FIG. 16, in step S90, the determination unit 65 determines that the capture button c3 is pressed from among the capture buttons c1, c2 and c3. Since processes of steps subsequent to step S90 are the same or substantially the same as the processes of steps S95 to S98, the redundant description thereof is omitted below. Note that in this operation, the content ID 12 and the display position information p2 are replaced with the content ID 13 and the display position information p3, respectively.

Next, the same or substantially the same processes as those of steps S76 to S81 (steps S121 to S126, S141 to S146) are performed. Specifically, the data exchange unit 61 transmits an update notification, which is a notification indicating an update of the shared electronic canvas, to the web browser displaying the operation display area 122c of the personal terminal 2c (S161). In this case, the content management server 6 transmits the update notification to all the personal terminals 2 and the shared terminal 4 participating in the remote meeting. Thereby, at the web browser displaying the operation display area 122c of the personal terminal 2c, the data exchange unit 21c receives the update notification. Note that in the third operation or processes, unlike the process of step S111 in the first operation of processes, the receiving of screen capturing is not performed in the operation display area 112c to which an image of the shared screen is to be imported. Therefore, the content management server 6 cannot identify the personal electronic canvas dc3 for the operation display area 112c to which an image obtained by the screen capturing is to be imported from among the plurality of personal electronic canvases. However, the content management server 6 can identify the shared electronic canvas cc since one shared electronic canvas cc is present in one virtual room. Therefore, the data exchange unit 61 of the content management server 6 transmits the update notification, which is a notification indicating an update of the shared electronic canvas, to the web browser displaying the operation display area 122c of the personal terminal 2c.

Next, at the web browser displaying the operation display area 122c of the personal terminal 2c, the data exchange unit 21c transmits a request for updated content data and display position information to the content management server 6 (S162). The data exchange unit 61 of the content management server 6 receives the request.

Next, the storing and reading processor 69 of the content management server 6 reads out the content ID 13, the data of the content, and the display position information p3 corresponding to the updated content from the shared content management table for the shared electronic canvas cc in the shared content management DB 6002 (S163). Then, the data exchange unit 61 transmits the content ID 13, the data of the content, and the display position information p3 to the personal terminal 2c (S164). Thereby, at the web browser of the personal terminal 2c, the data exchange unit 21c receives the content ID 13, the data of the content, and the display position information p3.

Next, the storing and reading processor 29c of the personal terminal 2c stores the content ID 13, the data of the content, and the display position information p3 received in step S164 in association with each other in the shared content management DB 2002c (S165). Thereby, at the web browser of the personal terminal 2c, the display control unit 24c updates the operation display area 122c to display content, which is the screen capture image (the entire screen) (S166).

Thus, the entire image displayed in the operation display area 132c for the shared electronic screen is captured and displayed in the operation display area 122c for the shared electronic canvas, whereby allowing the user C to import an image shared by the shared electronic screen as an image shared by the electronic canvas.

Details of Operation or Processes of Acquiring Event Detail:

Referring to FIG. 17 to FIG. 20, a description is now given of an operation or processes in which the user A acquires event detail. The event detail is information indicating to which image data a screen capturing was performed from among a plurality of pieces of image data shared by the user A on the shared electronic screen ss as illustrated in FIG. 8 and indicating which user instructed the screen capturing and when the screen capture was requested or performed, in a past event of which an organizer was the user A, for example.

Figure 17:
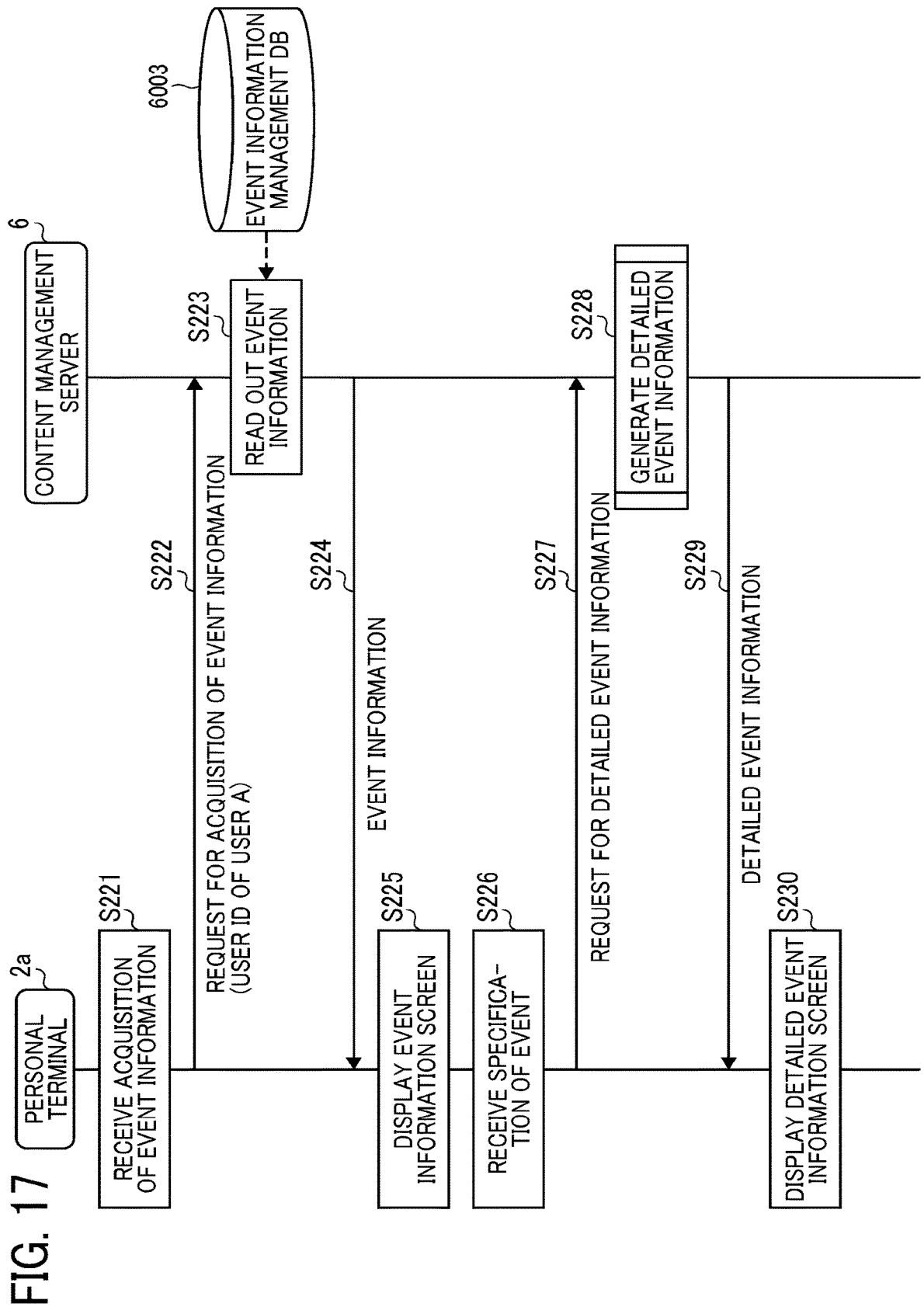
FIG. 17 is a sequence diagram illustrating an operation of displaying event detail, according to an embodiment of the present disclosure.
Figure 18:
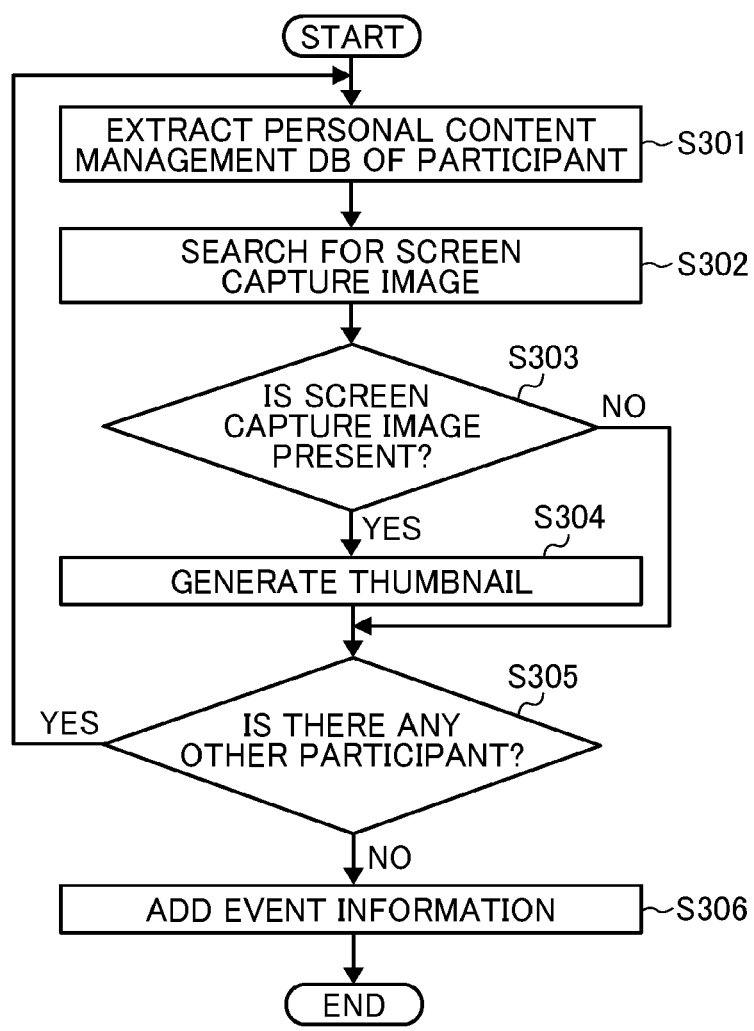
FIG. 18 is a flowchart illustrating an operation of generating the event detail, according to an embodiment of the present disclosure.

FIG. 17 is a sequence diagram illustrating an operation of displaying the event detail. FIG. 18 is a flowchart illustrating an operation of generating the event detail. FIG. 19 is a diagram illustrating a display example of an event information screen. FIG. 20 is a diagram illustrating a display example of an event detail screen.

First, the user A operates the personal terminal 2a to cause the receiving unit 22a to receive acquisition of event information (S221). Then, the data exchange unit 21a transmits a request for acquiring event information to the content management server 6 (S222). The request transmitted in step S22 includes a user ID of the user A. The data exchange unit 61 of the content management server 6 receives the request for acquiring the event information and the user ID.

Next, by using the user ID received in step S222 as a search key, the storing and reading processor 69 of the content management server 6 searches the event information management DB 6003 for a particular organizer ID corresponding to the user ID, to read out all event information records, each including the particular organizer ID (S223).

Next, the data exchange unit 61 transmits the event information that is read out in step S223 to the personal terminal 2a as a request source (S224). The data exchange unit 21a of the personal terminal 2a receives the event information regarding one or more events of which organizer was the user A.

Next, the display control unit 24a displays an event information screen as illustrated in FIG. 19 on the display 208 (S225). In the upper area of the event information screen, a keyword input field and a "Search" button are displayed. In the keyword input field, a keyword is input for filtering plural events of which organizer was the user A to a desired event(s), to designate a particular event(s). As another way for filtering, in the lower area of the event information screen, a part of specific event information is displayed, and the event name, the event date/time, and the event location are displayed.

Next, for example, when the user A presses the "Acquire" button for an event name "Regular", the receiving unit 22a receives a designation (selection) of the event (S226). Then, the data exchange unit 21 a transmits a request for event detail indicating detailed information about the designated event to the content management server 6 (S227). The request transmitted in step S227 includes an event ID for identifying the event for which designation has been received in step S226. The data exchange unit 61 of the content management server 6 receives the request for event detail and the event ID.

Next, at the content management server 6, the generation unit 64 generates event detail (S228). Referring to FIG. 18, a description is now given of an operation of generating the event detail.

As illustrated in FIG. 18, based on a participant ID associated with the event ID received in step S227 in the event information management DB 6003, the storing and reading processor 69 extracts the personal content management DB (see FIG. 4A) of a particular event (a particular event identified by the event ID) of the participant identified by the participant ID (S301). In other words, the storing and reading processor 69 extracts the personal content management DB 6001 associated with both the event ID and the user ID (participant ID).

Next, the storing and reading processor 69 searches the personal content management DB extracted in step S301 for an image (screen capture image), which is identified by the content type "image" (S302).

Next, the determination unit 65 determines whether an image is present (S303). When the determination unit 65 determines that an image is present (S303: YES), the generation unit 64 generates a thumbnail of the image that is determined to be present (S304). By contrast, when the determination unit 65 determines that no image is present (S303: NO), the generation unit 64 generates no thumbnail because there is no image for which a thumbnail is to be generated.

Next, the determination unit 65 determines whether there is another participant ID associated with the event ID received in step S227 in the event information management DB 6003, that is, whether there is another participant in the designated event (S305). When the determination unit 65 determines that there is another participant ID (S305: YES), the operation returns to step S301. When the determination unit 65 determines that there is no other participant ID (S305: NO), the storing and reading processor 69 reads out the event information that includes the event ID received in step S227 from the event information management DB 6003. Further, the generation unit 64 adds the read-out event information to the thumbnail generated in step in step S304 to generate event detail (S306). The process of step S228 ends.

Next, the data exchange unit 61 transmits the event detail generated in step S228 to the personal terminal 2a as a request source (S229). The data exchange unit 21a of the personal terminal 2a receives the event detail.

Next, at the personal terminal 2a, the display control unit 24a controls the display 208 to display an event detail screen as illustrated in FIG. 20 (S230). In the upper half area of the event detail screen, event details are displayed. The event details are a part of the event information. For example, the event details include the event name, the event date/time, the event place, the organizer's name, and the participant's name. Further, in the lower half area of the event detail screen, capture information is displayed. The capture information includes thumbnails and the number of captures for each of the thumbnails in order of capture date/time (creation date/time). Before generating the thumbnail in step S304 described above, the determination unit 65 determines whether in the same particular event (i.e., the particular event identified by the event ID), a thumbnail of the same screen capture image as a screen capture image for which the thumbnail is to be generated is already generated. When the determination unit 65 determines that the thumbnail of the same screen capture image is not generated yet, the generation unit 64 generates a thumbnail, and the storing and reading processor 69 stores the generated thumbnail in association with the number of captures "1". When the determination unit 65 determines that there is already the thumbnail of the same screen capture image, the determination unit 65 increments the number of captures associated with the thumbnail of the same screen capture image, and the storing and reading processor 69 stores the undated number of captures in association with the thumbnail. Note that the determination as to whether the screen capture images are identical to each other is made by performing image analysis, to determine that the screen capture images are identical to each other when the degree of similarity obtained by the image analysis is equal to or greater than a threshold. Thus, the number of captures for each screen capture image can be determined. Further, the storing and reading processor 69 acquires this number of captures stored in association with the thumbnail, and the generation unit 64 generates the event detailed information using the acquired number of captures. Thereby, the display control unit 24a displays the number of captures on the event detailed information screen at the personal terminal 2a. For example, when the users B and C have captured the same image, the number of captures is "2". Note that the number of captures can be omitted from the capture information on the event detail screen. When the determination unit 65 determines that there are two or more identical screen capture images in the personal content management DB 2001a extracted based on the same participant ID, the number of captures is incremented by one, instead of the number of screen capture images that are identified as being identical with each other. Thus, even when the same image is captured two or more times by the same participant, the number of captures is counted as one. Therefore, not the total number of captures but information indicating how many participants captured the same screen capture image is displayed on the event detailed information screen.

FIG. 20 illustrates an example in which the thumbnails of images captured by all the participants who participated in the designated event. In addition, when the organizer inputs a desired participant name in a field for entering a participant name and presses a "Filter" button, the receiving unit 22a receives the participant name, and the display control unit 24a displays a thumbnail(s) of the participant corresponding to the received participant name. In this case, when generating the thumbnail in step S304 of FIG. 18, the reading and storing processor 69 stores the participant ID of the participant who captured the screen capture image for which the thumbnail is to be generated in association with the thumbnail. Then, when the receiving unit 22a receives a particular participant name on the event detailed information screen as illustrated in FIG. 20, the generation unit 64 generates the event detailed information that includes only the thumbnail(s) associated with the participant ID corresponding to the received particular participant name. Thus, the display control unit 24a displays only the thumbnail(s) of the capture screen image(s) captured by the participant corresponding to the received particular participant name. In another example, when the receiving unit 22a receives an input of a particular participant name, the data exchange unit 21a transmits the particular participant name or the participant ID of the particular participant to the content management server 6. Thereby, the data exchange unit 21a of the personal terminal 2a receives the thumbnail(s) associated with the participant ID of the particular participant from the data exchange unit 61 of the content management server 6. Thus, the display control unit 24a displays the thumbnail(s) of capture screen image (s) captured by the particular participant whose name is entered. In still another example, the data exchange unit 21a of the personal terminal 2a receives in advance all the thumbnails of the event for which selection has been received by the receiving unit 22a in step S226, and the determination unit 25a determines which thumbnail(s) is to be displayed from all the thumbnails received by the receiving unit 21 a. In other words, when the receiving unit 22a receives a particular participant name, the determination unit 25a identifies the thumbnail(s) associated with the participant ID corresponding to the received particular participant name from the thumbnails that was received by the data exchange unit 21a in advance. Thereby the display control unit 24a displays the thumbnail(s) of the capture screen image(s) captured by the particular participant whose name is entered. In addition, although the generation unit 64 generates the thumbnail of the screen capture image in S304 of FIG. 18, the generation of the thumbnail can be omitted. For example, the event detailed information is generated by adding the event information to the screen capture image itself instead of the thumbnail. In this case, a screen capture image is displayed instead of the thumbnail in the capture information on the event detailed information screen.

As illustrated in FIG. 20, the personal terminal 2 displays thumbnails of the images that the participants actually captured from among the images shared from the personal terminal 2 of the organizer. Therefore, one or more images to which the participants paid attention are identified more accurately. The organizer can make comments and/or prepare materials at future meetings by using the identified one or images as a reference. Further, by displaying thumbnails representing the contents captured by the participants during the event and captured images, the organizer can more intuitively recognize which content has attracted attention. Although for example, a content ID identifying content and a capture image ID identifying a screen capture image can be displayed, it is difficult to tell which content is indicated only by the content ID and the captured image ID. By contrast, displaying thumbnails, screen capture images or the like makes it easy to identify content. Furthermore, as illustrated in FIG. 20, the personal terminal 2 can display the number of captures for each thumbnail, whereby the organizer can recognize to which image many participants paid attention. The organizer can make comments and/or prepare materials at future meetings by using the number of captures for each thumbnail as a reference. Furthermore, as illustrated in FIG. 20, the personal terminal 2 can filter the participants by entering a participant's name, whereby the organizer viewing the thumbnail(s) filtered by a particular participant recognizes which image(s) was captured by the particular participant from among the images shared by the organizer himself or herself. The organizer can make comments and/or prepare materials at future meetings by using the displayed thumbnail(s) filtered by a participant as a reference.

If the user C using the personal terminal 2c spends long time to import an image of a screen (content) from one operation display area 132c to the other operation display area 112c or 122c, the user C will miss a conversation in a meeting or the like. If a user misses a conversation in a remote meeting or the like performed through a communication network, the user finds it more difficult to tell the remote partner that the user wants him or her to repeat previous remarks or comments, compared with when the user joins the meeting or the like in the real conference room, for example. On the other hand, according to the present embodiment, the user C can capture an image of the screen only by pressing the capture button c1, c2, or c3, whereby the drawback of missing a conversation in a meeting or the like can be overcome. In addition, since the shared electronic canvas and the personal electronic canvas are associated in advance with the shared electronic screen, the user C is saved from specifying the URL or the like of the shared electronic screen, whereby an image of a screen can be captured and imported quickly. Thus, more convenient sharing of content between multiple communication terminals is provided, and more efficient communication and collaboration between multiple users using different private terminals respectively is provided. Furthermore, this is provided in a way which minimizes technical complexity and the usage of computer resources.

Variations:

Although the description given above is of an example embodiment in which the personal terminal 2a transmits the request for acquisition of the event information (see S222) and the request for the event detail (see S227), this is just an example. In another example, the shared terminal 4 or any information processing terminal such as a PC other than the personal terminal and the shared terminal transmits the requests. In other words, the personal terminal is an example of an information processing terminal that transmits a request for acquisition of event information and a request for event detail.

In the above embodiment, the thumbnail is an example of distinction information distinguishing a capture image. The distinction information includes time information indicating a specific time of the event in addition to the thumbnail.

In another example, instead of the thumbnail included in the distinction information, other images can be used based on which a capture image is identified, such as a screen capture image itself. In still another example, instead of the thumbnail, a capture image ID identifying a screen capture image can be used. In still another example, instead of or in addition to the thumbnail, a page number included in the screen capture image can be included in the distinction information, and the page number included in the screen capture image can be displayed on the event detailed information screen.

Although in the above-described embodiments and variations, the capture buttons c1, c2 and c3 are each represented by an icon having a shape of a camera, this is just one example of "instruction information". In addition to an image such as an icon, the instruction information can be characters such as "CAPTURE", an arrow, or a combination of an icon and characters, for example.

In addition, although the description of the embodiments given heretofore is of a case where the Canvas element of HTML is used, alternatively, WebGL, SVG (scalable vector graphics), FLASH (registered trademark), etc. can be used.

Also, although in the above embodiments, two operation display areas are displayed by one web browser, alternatively two web browsers (a first web browser and a second web browser) respectively display two operation display areas (a first operation display area and a second operation display area). In another example, instead of two operation display areas, three or more web browsers can display operation display areas respectively (in this case, three or more operation display areas). In still another example, one web browser can display three or more operation display areas.

Although the description given heretofore of the embodiments is of a case where each of the personal electronic canvas and the shared electronic canvas is an infinite electronic canvas, the present disclosure is not limited to this. Alternatively, each of the personal electronic canvas and the shared electronic canvas can be a finite electronic canvas.

In addition, the personal electronic canvas can be a limited finite electronic canvas displayed within the displayable range of the display 208 of the personal terminal 2. Similarly, the shared electronic canvas can be a limited finite electronic canvas displayed within the displayable range of the display 408 of the shared terminal 4.

Although in the above embodiments, no description is given of a case where one or more other terminals or one or more other servers relay data (or information) on a communication path between the personal terminal 2 and the shared terminal 4 and the content management server 6, one or more other terminals or one or more other servers can relay data (or information).

An "event" in the present disclosure includes a meeting or gathering in which plural persons at one site or at plural remote sites participate, such as a meeting, conference, seminar, class, event, ceremony, or other social activities.

The CPUs 201, 401, and 601 illustrated in FIG. 2 can be either single or plural.

Further, in the example of FIG. 1, the shared terminal 4 and the shared electronic canvas cc can be omitted.

In addition, although the description given heretofore of the embodiments is of a case where multiple users conduct a teleconference, the present disclosure is not limited to such a remote conference but can be applied to various events in which multiple persons at different remote sites or even at the same site communicate via a network in a virtual room. Example of the various events include a business meeting between a vendor and a client at different remote sites or at the same site, a seminar in which a presenter and other participants at the same site or at different remote sites participate, a lecture or class in which a teacher and students at the same site or at different remote sites participate, and exhibitions held at multiple venues at different remote sites.

Each of the functions (see FIG. 3A and FIG. 3B) of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Although, according to the conventional method, an image(s) to which the participants have paid attention is predicted, an image(s) to which the participants are actually paying attention is not identified accurately.

According to an embodiment of the present disclosure, one or more images to which a participant is paying attention are identified more accurately.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. A content server for managing content used in one or more events, the server comprising:
one or more memories that store, for each participant of one or more participants of an event, one or more capture images, each capture image of the one or more capture images being an image of a shared electronic screen displayed on a personal terminal of the participant, the shared electronic screen including particular content used in the event and having been captured by the personal terminal of the participant during the event in response to a capture operation by the participant at the personal terminal; and circuitry configured to determine, for each capture image captured by a participant of the event, a number of identical capture images, from one or more capture images captured by other participants of the event, using image analysis; and transmit, for each particular capture image of the one or more capture images, the determined number of identical capture images in association with distinction information distinguishing the particular capture image to a particular information processing terminal.

2. The content server of claim 1, wherein the circuitry is further configured to generate a thumbnail of each capture image as the distinction information.

3. The content server of claim 1, wherein the one or more memories further store an event identifier identifying the event during which each capture image has been captured in association with the capture image, and further store event information related to the event for each of the one or more events, and wherein the circuitry is further configured to:

transmit the event information to the particular information processing terminal;

receive a particular event identifier identifying a particular event of the one or more events, the particular event being designated by the particular information processing terminal; and transmit particular distinction information distinguishing, from among the one or more capture images, one or more particular capture images associated with the particular event identifier.

4. The content server of claim 3, wherein the event information stored in the one or more memories associates, for each of the one or more events, an organizer identifier identifying an organizer of the event, with the event identifier, the circuitry is further configured to obtain particular event information of one or more particular events identified with one or more particular event identifiers each associated with a particular organizer identifier that matches an identifier of a user operating the particular information processing terminal, and transmit the particular event information of the one or more particular events to the particular information processing terminal, and wherein the particular event is selected from the one or more particular events indicated by the particular event information that is transmitted.

5. The content server of claim 1, wherein the particular information processing terminal is a personal terminal operated by an organizer of the event.

6. The content server of claim 1, wherein the circuitry is further configured to, in response to receiving designation of a particular participant of the one or more participants from the particular information processing terminal, transmit the distinction information of each capture image, of the one or more capture images stored in the one or more memories, that was captured by the particular participant for which the designation is received.

7. An information sharing system, comprising:

the content server of claim 1; and the particular information processing terminal, which is configured to control a display to display the distinction information received from the content server.

8. The information sharing system of claim 7, wherein the particular information processing terminal displays a thumbnail of each capture image as the distinction information.

9. The information sharing system of claim 7, wherein the particular information processing terminal includes display control circuitry configured to display the distinction information, of a given capture image of the one or more capture images, in association with the determined number of identical capture images for the given capture image.

10. A communication control method performed by a content server for managing content used in one or more events, the method comprising:

storing, for each participant of one or more participants of an event, one or more capture images, each capture image of the one or more capture images being an image of a shared electronic screen displayed on a personal terminal of the participant, the shared electronic screen including particular content used in the event and having been captured by the personal terminal of the participant during the event in response to a capture operation by the participant at the personal terminal; and determining, for each capture image captured by a participant of the event a number of identical capture images, from one or more capture images captured by other participants of the event, using image analysis; and transmitting, for each particular capture image of the one or more capture images, the determined number of identical capture images in association with distinction information distinguishing the particular capture image to a particular information processing terminal.

11. A computer-readable non-transitory storage medium storing a program for causing a computer to execute a communication control method performed by a content server for managing content used in one or more events, the method comprising:

storing, for each participant of one or more participants of an event, one or more capture images, each capture image of the one or more capture images being an image of a shared electronic screen displayed on a personal terminal of the participant, the shared electronic screen including particular content used in the event and having been captured by the personal terminal of the participant during the event in response to a capture operation by the participant at the personal terminal; and determining, for each capture image captured by a participant of the event, a number of identical capture images, from one or more capture images captured by other participants of the event, using image analysis; and transmitting, for each particular capture image of the one or more capture images, the determined number of identical capture images in association with distinction information distinguishing the particular capture image to a particular information processing terminal.

* * * * *